United States Patent
Eiles

(10) Patent No.: US 11,499,817 B2
(45) Date of Patent: Nov. 15, 2022

(54) COORDINATE MEASURING MACHINE WITH VISION PROBE FOR PERFORMING POINTS-FROM-FOCUS TYPE MEASUREMENT OPERATIONS

(71) Applicant: Mitutoyo Corporation, Kanagawa-ken (JP)

(72) Inventor: Travis Matthew Eiles, Bothell, WA (US)

(73) Assignee: Mitutoyo Corporation, Kanagawa-ken (JP)

(*) Notice: Subject to any disclaimer, the term of this patent is extended or adjusted under 35 U.S.C. 154(b) by 383 days.

(21) Appl. No.: 16/887,589

(22) Filed: May 29, 2020

(65) Prior Publication Data
US 2021/0372769 A1 Dec. 2, 2021

(51) Int. Cl.
*H04N 11/02* (2006.01)
*G01B 11/00* (2006.01)
(Continued)

(52) U.S. Cl.
CPC .......... *G01B 11/007* (2013.01); *G06T 1/0014* (2013.01); *G06T 7/571* (2017.01);
(Continued)

(58) Field of Classification Search
CPC ............................................ G06T 2207/30164
(Continued)

(56) References Cited

U.S. PATENT DOCUMENTS 3,936,149 A * 2/1976 Imai ................... G02B 27/0025
385/124
4,498,778 A * 2/1985 White .................... G01B 11/25
356/243.4
(Continued)

FOREIGN PATENT DOCUMENTS

WO 2019/133234 A1 7/2019

OTHER PUBLICATIONS

Alicona, "µCMM New optical micro-coordinate measurement machine," Alicona Focus Variation Magazine, English Edition 8, 2018, 65 pages.
(Continued)

*Primary Examiner* — Leron Beck
(74) *Attorney, Agent, or Firm* — Seed IP Law Group LLP

(57) ABSTRACT

A coordinate measuring machine (CMM) system is provided including utilization of a vision probe (e.g., for performing operations for determining and/or measuring surface profiles of workpieces, etc.) The angular orientation of the vision probe may be adjusted using a rotation mechanism so that the optical axis of the vision probe is directed toward an angled surface of a workpiece (e.g., in some implementations the optical axis may be approximately perpendicular to the angled workpiece surface). X-axis, y-axis and z-axis slide mechanisms (e.g., moving in mutually orthogonal directions) may in conjunction move the vision probe to acquisition positions along an image stack acquisition axis (which may approximately coincide with the optical axis) for acquiring a stack of images of the angled workpiece
(Continued)

surface. Focus curve data may be determined from analysis of the image stack, which indicates 3-dimensional positions of surface points on the angled surface of the workpiece.

21 Claims, 12 Drawing Sheets

(51) Int. Cl.
*G06T 7/571* (2017.01)
*G06T 1/00* (2006.01)
*H04N 5/232* (2006.01)

(52) U.S. Cl.
CPC .............. *G06T 2207/30164* (2013.01); *H04N 5/23299* (2018.08)

(58) Field of Classification Search
USPC ......................................................... 356/601
See application file for complete search history.

(56) References Cited

U.S. PATENT DOCUMENTS

| | | | |
|---|---|---|---|
| 4,908,951 A | 3/1990 | Gurny | |
| 5,409,538 A * | 4/1995 | Nakayama | G03F 7/70583 118/712 |
| 5,661,546 A * | 8/1997 | Taniguchi | G03F 7/70883 355/53 |
| 5,781,302 A * | 7/1998 | Grow | G01B 11/306 356/600 |
| 5,849,375 A * | 12/1998 | Smith | B01D 39/2086 428/34.5 |
| 5,982,489 A * | 11/1999 | Shiraishi | G01B 11/22 356/504 |
| 6,335,787 B1 * | 1/2002 | Nishi | G03F 7/70225 355/53 |
| 6,399,942 B1 * | 6/2002 | Ishihara | G02B 21/0068 250/234 |
| 7,141,802 B2 * | 11/2006 | Takeyama | G02B 21/16 250/208.1 |
| 7,400,412 B2 * | 7/2008 | Christoph | G01B 11/005 356/616 |
| 7,652,275 B2 * | 1/2010 | Gladnick | G01B 11/25 356/3.01 |
| 7,660,688 B2 | 2/2010 | Ishikawa et al. | |
| 8,085,295 B2 * | 12/2011 | Tobiason | H04N 5/2256 382/256 |
| 8,111,905 B2 | 2/2012 | Campbell | |
| 8,229,694 B2 * | 7/2012 | Nakagawa | G01B 21/045 702/95 |
| 8,332,173 B2 | 12/2012 | Ishikawa | |
| 8,422,127 B2 * | 4/2013 | Uchiyama | G02B 21/241 359/383 |
| 8,438,746 B2 | 5/2013 | Usui | |
| 8,581,162 B2 | 11/2013 | Campbell | |
| 8,817,240 B2 | 8/2014 | Jones et al. | |
| 8,995,749 B2 | 3/2015 | Bryll | |
| 9,060,117 B2 | 6/2015 | Bryll et al. | |
| 9,115,982 B2 | 8/2015 | Jones et al. | |
| 9,161,014 B2 | 10/2015 | Prantl et al. | |
| 9,291,447 B2 | 3/2016 | Bumgardner | |
| 9,639,083 B2 | 5/2017 | Tseo et al. | |
| 9,646,425 B2 | 5/2017 | Yu et al. | |
| 9,804,082 B2 * | 10/2017 | Mocnik | G01N 15/0618 |
| 9,841,378 B2 * | 12/2017 | Thrush | G01N 21/6456 |
| 9,881,400 B2 | 1/2018 | Zuiderweg et al. | |
| 9,952,586 B2 | 4/2018 | Yu et al. | |
| 10,007,101 B2 | 6/2018 | Prantl et al. | |
| 10,184,773 B2 | 1/2019 | Jansson | |
| 10,352,679 B2 | 7/2019 | Tobiason | |
| 10,422,636 B2 | 9/2019 | Nakagawa et al. | |
| 10,466,028 B2 * | 11/2019 | Takesako | G01B 3/008 |
| 2001/0001572 A1 * | 5/2001 | Ikezawa | G01M 11/0235 356/124 |
| 2002/0080833 A1 * | 6/2002 | Matsuura | H01S 5/141 372/50.23 |
| 2004/0191786 A1 * | 9/2004 | Yue | G01N 33/542 435/7.1 |
| 2009/0251783 A1 * | 10/2009 | Huibers | G02B 27/148 359/583 |
| 2009/0312859 A1 * | 12/2009 | Alpay | G05B 19/40938 700/103 |
| 2012/0082364 A1 * | 4/2012 | Tani | G06T 7/90 382/133 |
| 2013/0162807 A1 * | 6/2013 | Bryll | H04N 5/235 348/86 |
| 2013/0176393 A1 * | 7/2013 | Onishi | H04N 13/398 348/43 |
| 2016/0252451 A1 * | 9/2016 | Kawate | G02B 19/0085 359/858 |
| 2016/0290927 A1 * | 10/2016 | Buczkowski | G01N 21/47 |
| 2017/0090742 A1 | 3/2017 | Ade et al. | |
| 2019/0145764 A1 | 5/2019 | Atherton | |
| 2019/0293402 A1 | 9/2019 | Kiyotani et al. | |
| 2022/0101511 A1 * | 3/2022 | Emtman | B25J 9/1697 |

OTHER PUBLICATIONS

Mitutoyo, "Probes for Coordinate Measuring Machines," Coordinate Measuring Machines, MPP-300Q/MPP-300, Bulletin No. 1989, Apr. 2010, 36 pages.

Newton et al., "Additive Manufacturing," *Additive Manufacturing* 25(2019), pp. 365-389, Nov. 2018, (25 pages).

Renishaw, "REVO-2 user's guide," Documentation part No. H-1000-7590-04-E, Oct. 2019, 151 pages.

Renishaw, "RVP user's guide," Part No. H-1000-3322-02-A, Nov. 2019, 24 pages.

* cited by examiner

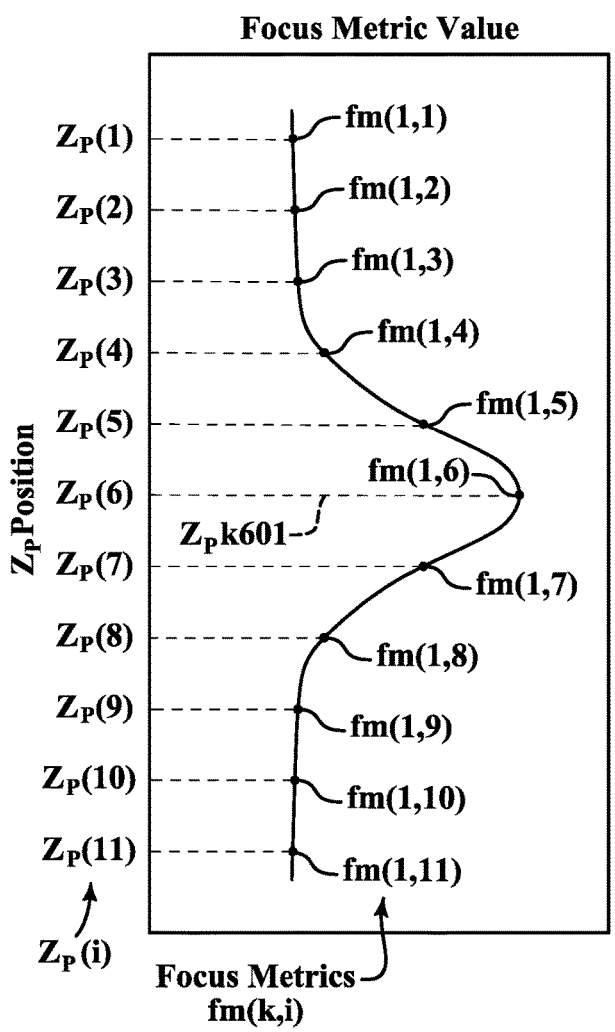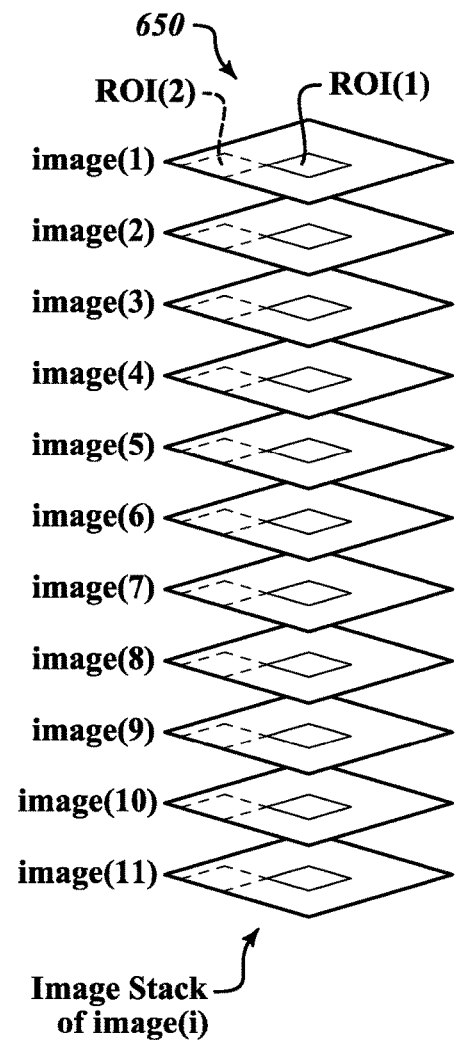
FIG. 6A                FIG. 6B

COORDINATE MEASURING MACHINE WITH VISION PROBE FOR PERFORMING POINTS-FROM-FOCUS TYPE MEASUREMENT OPERATIONS

BACKGROUND

Technical Field

This disclosure relates to precision metrology, and more particularly to coordinate measuring machines with movement mechanisms capable of moving measurement probes along multiple axes and at desired angles/orientations relative to workpiece surfaces.

Description of the Related Art

A typically known coordinate measuring machine (CMM) includes a probe, a movement mechanism and a controller. The probe may be a tactile measuring probe with a probe tip that physically touches a workpiece (i.e., an object) to be measured. Some examples of tactile probes include touch probes, or scanning probes (e.g., for which the probe tip is positioned in contact and slid along so as to "scan" over the surface of the workpiece). In operation, the movement mechanism of the CMM holds and moves the probe, and the controller controls the movement mechanism. The movement mechanism typically enables the probe to move in mutually-orthogonal X, Y, and Z directions.

One exemplary CMM is disclosed in U.S. Pat. No. 7,660,688, which is hereby incorporated herein by reference in its entirety. As described, a CMM with a movement mechanism moves a contact point of a tactile scanning probe along a surface of a workpiece. During the movements, the probe is forced against the workpiece to acquire displacements of the movement mechanism and the probe, and the CMM synthesizes the displacements to detect the position (measurement value) of the contact point, to thereby measure/determine a surface profile of the workpiece based on the detected surface points.

While utilization of such CMMs with such tactile probes have enabled measuring surface profiles of workpieces, such processes have certain limitations (e.g., related to the amount of time required for the processes to be performed, the required physical contact of the probe tip with the workpiece, etc.) Techniques that may improve or otherwise enhance the utilization of a CMM for measuring and/or otherwise determining a surface profile of a workpiece would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a coordinate measuring machine system is provided, including a vision probe, a slide mechanism configuration, a rotation mechanism, one or more processors, and a memory coupled to the one or more processors. The vision probe includes a light source, and an objective lens that inputs image light arising from a surface of a workpiece which is illuminated by the light source, and transmits the image light along an imaging optical path, wherein the objective lens defines an optical axis of the vision probe which extends at least between the objective lens and the workpiece surface. The vision probe also includes a camera that receives imaging light transmitted along the imaging optical path and provides images of the workpiece surface. The slide mechanism configuration includes an x-axis slide mechanism, a y-axis slide mechanism and a z-axis slide mechanism that are each configured to move the vision probe in mutually orthogonal x-axis, y-axis and z-axis directions, respectively, within a machine coordinate system. The rotation mechanism is coupled between the z-axis slide mechanism and the vision probe, and is configured to rotate the vision probe to different angular orientations relative to the z-axis of the machine coordinate system. The memory stores program instructions that when executed by the one or more processors cause the one or more processors to perform the following:

adjust the orientation of the vision probe using the rotation mechanism so that the optical axis of the vision probe is directed toward a surface of the workpiece wherein the optical axis of the vision probe is not parallel to the z-axis of the machine coordinate system and corresponds to an image stack acquisition axis;

acquire an image stack comprising a plurality of images each corresponding to a focus position of the vision probe along the image stack acquisition axis; and determine focus curve data based at least in part on an analysis of the images of the image stack, wherein the focus curve data indicates 3-dimensional positions of a plurality of surface points on the surface of the workpiece.

Further, the acquiring of the image stack, set forth above, includes:

adjusting a plurality of the slide mechanisms to move the vision probe from a first image acquisition position to a second image acquisition position which are each along the image stack acquisition axis, wherein the vision probe acquires first and second images of the plurality of images at the first and second image acquisition positions, respectively; and adjusting the plurality of the slide mechanisms to move the vision probe from the second image acquisition position to a third image acquisition position which is also along the image stack acquisition axis, wherein the vision probe acquires a third image of the plurality of images at the third image acquisition position.

According to another aspect, a method of measuring a workpiece surface is provided. The method includes generally four steps:

operating a coordinate measuring machine system, which includes (i) a vision probe configured to image a surface of a workpiece based on image light transmitted along an optical axis of the vision probe; (ii) a slide mechanism configuration comprising an x-axis slide mechanism, a y-axis slide mechanism and a z-axis slide mechanism that are each configured to move the vision probe in mutually orthogonal x-axis, y-axis and z-axis directions, respectively, within a machine coordinate system; and (iii) a rotation mechanism coupled between the z-axis slide mechanism and the vision probe and configured to rotate the vision probe to different angular orientations relative to the z-axis of the machine coordinate system;

adjusting the orientation of the vision probe using the rotation mechanism so that the optical axis of the vision probe is directed toward a surface of the workpiece wherein the optical axis of the vision probe is not parallel to the z-axis of the machine coordinate system and corresponds to an image stack acquisition axis;

acquiring an image stack comprising a plurality of images each corresponding to a focus position of the vision probe along the image stack acquisition axis, wherein the acquiring of the image stack includes: (i) adjusting a plurality of the slide mechanisms to move the vision probe from a first image acquisition position to a second image acquisition position which are each along the image stack acquisition axis, wherein the vision probe acquires first and second images of the plurality of images at the first and second image acquisition positions, respectively; and (ii) adjusting the plurality of the slide mechanisms to move the vision probe from the second image acquisition position to a third image acquisition position which is also along the image stack acquisition axis, wherein the vision probe acquires a third image of the plurality of images at the third image acquisition position; and determining focus curve data based at least in part on an analysis of the images of the image stack, wherein the focus curve data indicates 3-dimensional positions of a plurality of surface points on the surface of the workpiece.

BRIEF DESCRIPTION OF THE DRAWINGS

FIGS. 6A and 6B illustrate an exemplary method of how an image stack obtained by the vision probe may be used to determine a relative position/coordinate of a point on a workpiece surface along a probe coordinate system z-axis direction;

DETAILED DESCRIPTION

Figure 1A:
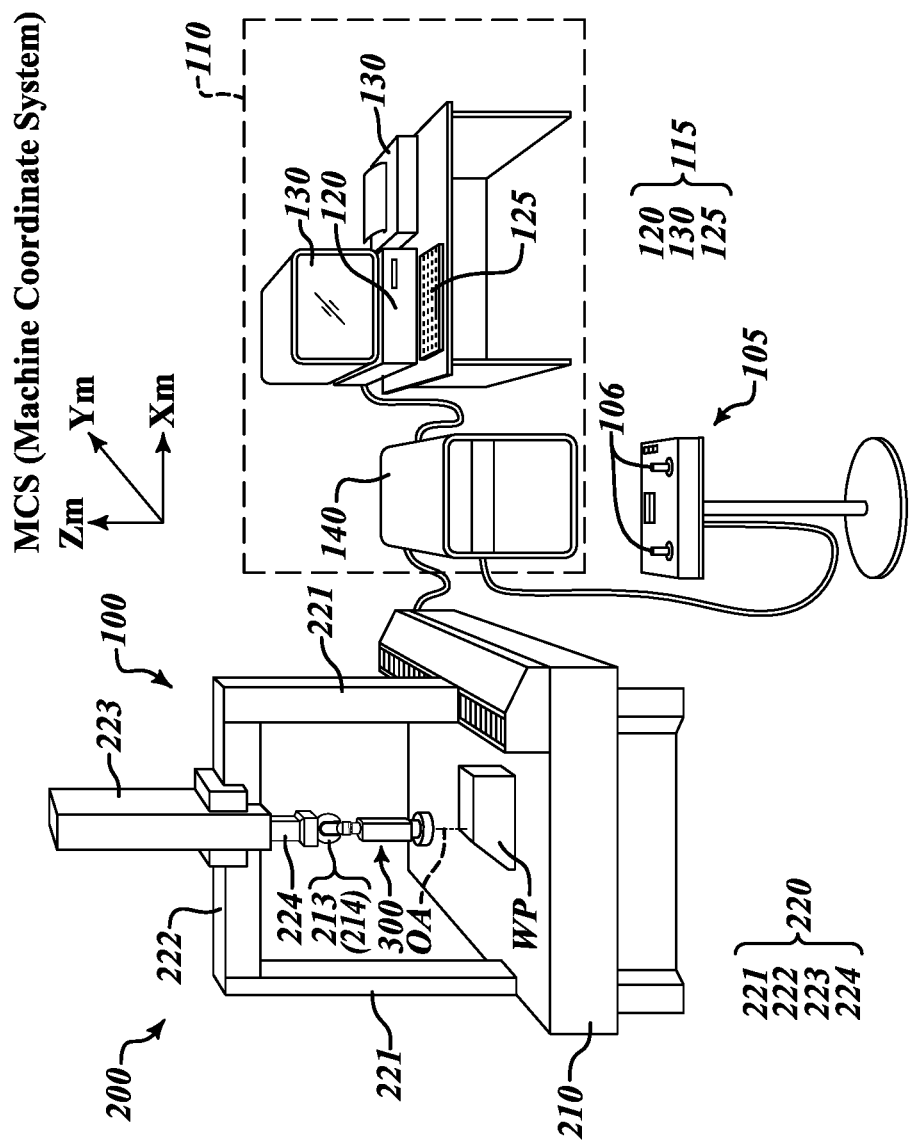
FIG. 1A is a diagram showing various components of a coordinate measuring machine (CMM) according to an embodiment.

FIG. 1A is a diagram showing various components of a coordinate measuring machine (CMM) 100. As shown in FIG. 1A, the coordinate measuring machine 100 includes a machine body 200 that moves a probe 300, an operation unit 105 having manually-operated joysticks 106, and a processing device configuration 110. The machine body 200 includes a surface plate 210, a movement mechanism configuration 220 (see also FIG. 2), and the vision probe 300. The movement mechanism configuration 220 includes an X-axis slide mechanism 225, a Y-axis slide mechanism 226, and a Z-axis slide mechanism 227 (FIG. 2) that are provided to stand on the surface plate 210 for holding and three-dimensionally moving the vision probe 300 relative to the workpiece WP to be measured as shown in FIG. 1A. The movement mechanism configuration 220 also includes a rotation mechanism 214.

Specifically, the movement mechanism configuration 220 includes beam supports 221 capable of moving in a Ym direction in a machine coordinate system (MCS), a beam 222 bridged between the beam supports 221, a column 223 capable of moving in an Xm direction in the machine coordinate system on the beam 222, and a Z-axis movement member 224 (e.g., a spindle) capable of moving in a Zm direction in the machine coordinate system inside the column 223 as shown in FIG. 1. The X-axis slide mechanism 225, the Y-axis slide mechanism 226, and the Z-axis slide mechanism 227 shown in FIG. 2 are provided between the beam 222 and the column 223, between the surface plate 210 and the beam supports 221, and between the column 223 and the Z-axis movement member 224, respectively. The vision probe 300 is attached to a probe head 213, which includes the rotation mechanism 214 and which is attached to and supported by an end of the Z-axis movement member 224. The rotation mechanism 214 enables the vision probe 300 to be rotated relative to the Z-axis movement member 224, as will be described in more detail below. The X-axis slide mechanism 225, the Y-axis slide mechanism 226, and the Z-axis slide mechanism 227 are each configured to move the probe 300 in the mutually orthogonal X, Y, Z-axes directions, respectively, within the MCS.

As shown in FIG. 2, the X-axis slide mechanism 225, the Y-axis slide mechanism 226, and the Z-axis slide mechanism 227 are provided with an X-axis scale sensor 228, a Y-axis scale sensor 229, and a Z-axis scale sensor 230, respectively. Thus, a moving amount of the vision probe 300 in the X-axis, Y-axis and Z-axis directions in the machine coordinate system (MCS) can be obtained from outputs of the X-axis scale sensor 228, the Y-axis scale sensor 229, and the Z-axis scale sensor 230. In the illustrated implementation, the moving directions of the X-axis slide mechanism 225, the Y-axis slide mechanism 226, and the Z-axis slide mechanism 227 coincide with the Xm direction, the Ym direction, and the Zm direction in the machine coordinate system (MCS), respectively. In various implementations, these relatively straightforward correlations and the associated components may help ensure high levels of accuracy and relatively simplified processing of the movements and position control/sensing in the Xm, Ym and Zm directions.

The probe head 213 with the rotation mechanism 214 includes one or more rotary sensors 215 (see FIG. 2) for sensing an angular rotation/position/orientation of the vision probe 300, as will be described in more detail below.

In various implementations, the vision probe 300 may be utilized for performing operations for determining and/or measuring a surface profile of the workpiece WP. As will be described in more detail below, the angular orientation of the vision probe 300 may be adjusted using the rotation mechanism 214 so that the optical axis OA of the vision probe is directed toward an angled surface of the workpiece WP (e.g., in some implementations the optical axis OA may be made to be approximately perpendicular to the angled workpiece surface). The x-axis, y-axis and z-axis slide mechanisms 225, 226 and 227 (e.g., moving in mutually orthogonal directions) may in conjunction move the vision probe 300 to image acquisition positions along an image stack acquisition axis (which may approximately coincide with the optical axis OA) for acquiring a stack of images of the angled workpiece surface. Focus curve data may be determined from analysis of the image stack (e.g., as part of points-from-focus (PFF) type measurement operations), which indicates 3-dimensional positions of surface points on the angled surface of the workpiece WP.

As shown in FIG. 2, the operation unit 105 is connected to a command portion 402 of the processing device configuration 110. Various commands can be inputted to the machine body 200 and the processing device configuration 110 via the operation unit 105. As shown in FIG. 1A, the processing device configuration 110 includes a motion controller 140 and a host computer system 115. In various implementations, the processing device configuration 110 may compute shape coordinates of the workpiece WP to be measured based at least in part on the moving amount of the vision probe 300 moved by the movement mechanism configuration 220 and/or the analysis of data (e.g., including an image stack) obtained by the vision probe 300, as will be described in more detail below. In various implementations, the shape coordinates may correspond to a depth map and/or a surface topography of the workpiece and/or a workpiece surface, and may be based on relative positions (e.g., indicated by coordinates) of surface points on the workpiece.

The motion controller 140 of FIG. 1A mainly controls the movement of the vision probe 300. The host computer system 115 processes movements and positions carried out and obtained in the machine body 200. In the present implementation, the processing device configuration 110 having a combined function of the motion controller 140 and the host computer system 115 is shown in the block diagram of FIG. 2 and will be described below. The host computer system 115 includes a computer 120, an input unit 125 such as a keyboard and output units 130 such as a display and a printer.

Those skilled in the art will appreciate that the host computer system 115 and/or other computing systems and/or control systems described or usable with the elements and methods described herein may generally be implemented using any suitable computing system or device, including distributed or networked computing environments, and the like. Such computing systems or devices may include one or more general purpose or special purpose processors (e.g., non-custom or custom devices) that execute software to perform the functions described herein. Software may be stored in memory, such as random access memory (RAM), read only memory (ROM), flash memory, or the like, or a combination of such components. Software may also be stored in one or more storage devices, such as optical based disks, flash memory devices, or any other type of non-volatile storage medium for storing data. Software may include one or more program modules that include processes, routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

As shown in FIG. 2, the processing device configuration 110 includes the command portion 402, a slide mechanism controller 404, a position determination portion 406, a vision probe controller 408, a vision probe data portion 410, an analyzer portion 412, and a storage portion 414.

The command portion 402 shown in FIG. 2 gives predetermined commands to the slide mechanism controller 404 (e.g., on the basis of commands inputted by the operation unit 105 or the input unit 125). The command portion 402 generates, as a positional command to the movement mechanism configuration 220, a coordinate value in the machine coordinate system for each control cycle in consideration of, for example, moving directions, moving distances, moving speeds, and the like to move the vision probe 300 to a plurality of positions (e.g., image acquisition positions, etc.)

The slide mechanism controller 404 shown in FIG. 2 performs drive control by outputting a drive control signal D in response to a command from the command portion 402, thereby passing an electric current through motors of the X-axis, Y-axis, and Z-axis slide mechanisms 225, 226, and 227 in the movement mechanism configuration 220.

A position latch 216 in one implementation communicates with the various sensors and/or drive mechanisms in order to ensure that the coordinates of the CMM 100 and the vision probe 300 at the time that an image is acquired are properly synchronized. More specifically, in various implementations the position latch 216 may be utilized to help ensure the accuracy of the measurements derived from the images in an image stack. In various implementations, the operations of the position latch 216 enable the CMM machine coordinates (which reflect the position of the connection point or other reference point of the vision probe 300 during a particular measurement) to be properly combined with the position data determined from the vision probe images (e.g., which are relative to the vision probe's 300 position and orientation). In certain implementations, the position latch 216 may be utilized to trigger measurements from CMM position sensors (e.g., sensors 215 and 228-230, etc.), which may include scales, encoders or other sensing elements that track an overall position and orientation of the vision probe 300 (e.g. including its base position) in the machine coordinate system. In some implementations, the position latch 216 may also trigger an image acquisition from the vision probe 300 (e.g., as part of an image stack, for which a trigger signal may be provided for each image in an image stack, with the corresponding position of the vision probe 300 also correspondingly being synchronized and tracked for each image acquisition).

Figure 1B:
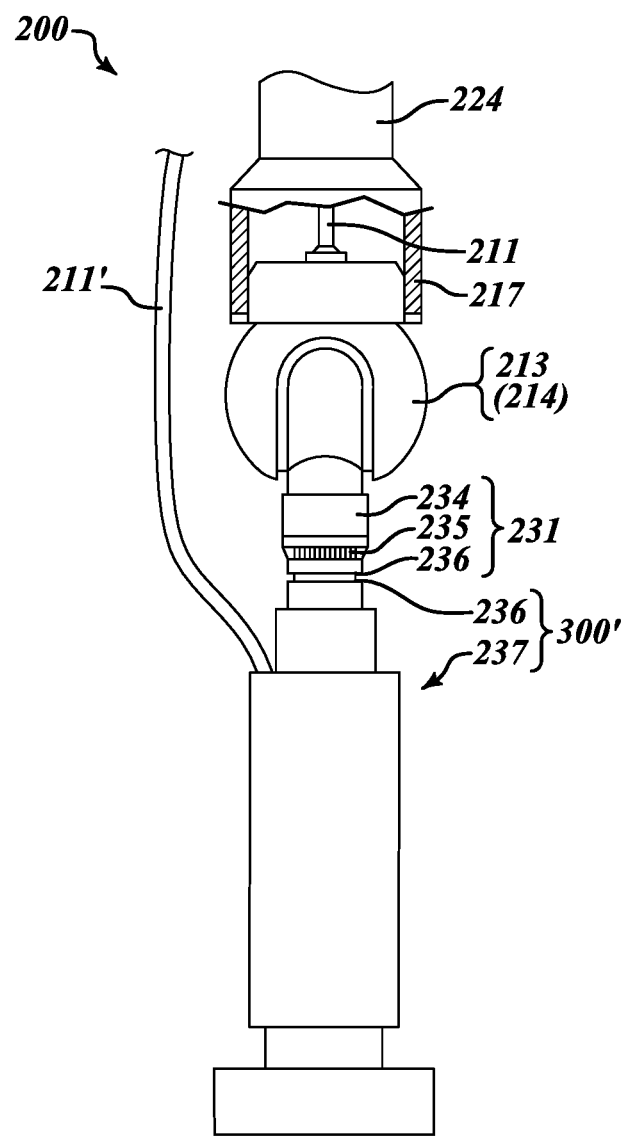
FIG. 1B is a diagram schematically illustrating a vision probe coupled to a probe head of a CMM such as that illustrated in FIG. 1A.
Figure 2:
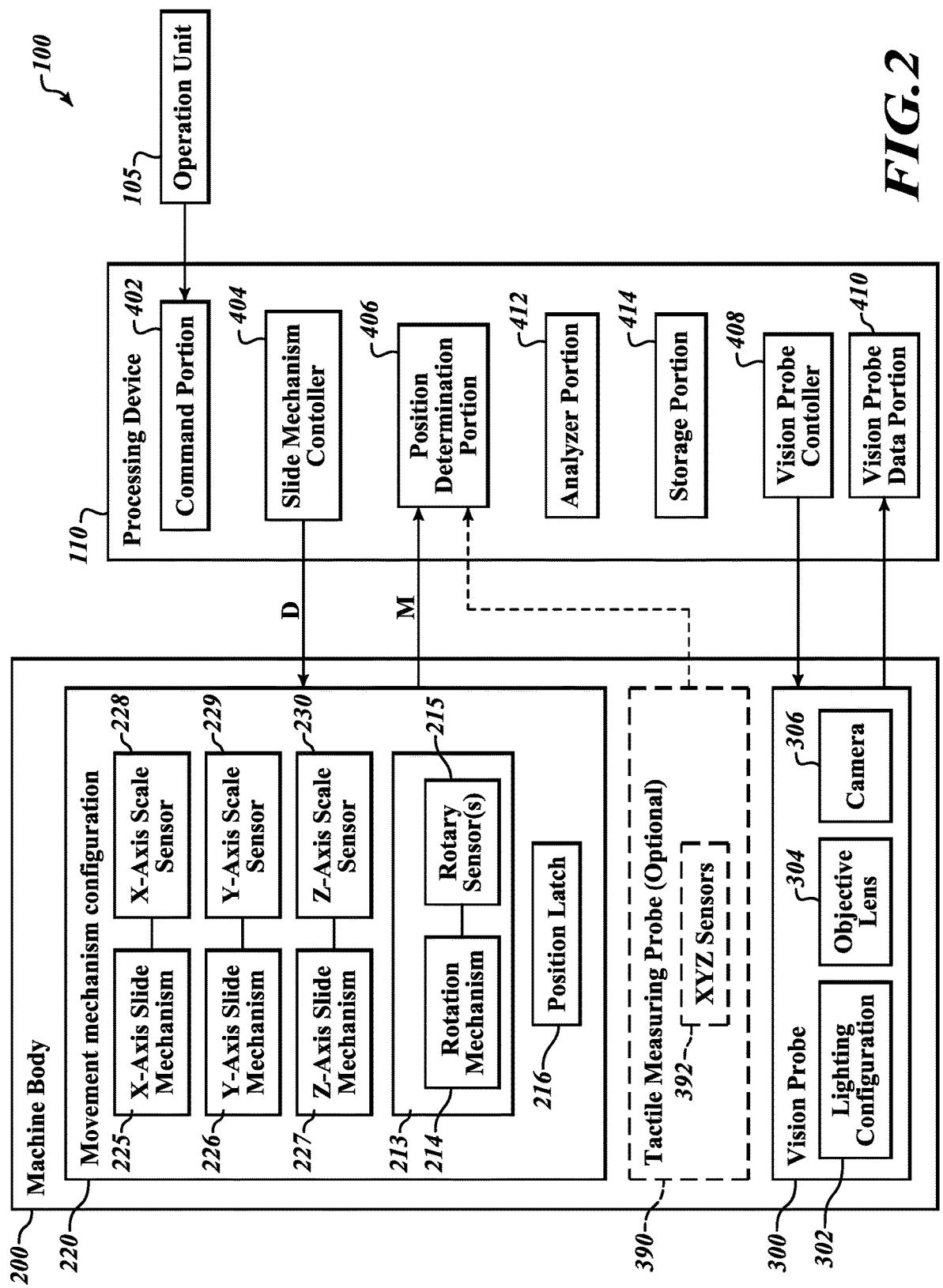
FIG. 2 is a block diagram showing various control elements of a CMM such as that of FIG. 1A.

FIG. 1B is a diagram schematically illustrating certain components of the machine body 200 of the CMM 100 and a vision probe 300', which may be similar to the vision probe 300 of FIG. 1A. As shown in FIG. 1B, the machine body 200 includes a probe head 213. The probe head 213 receives and transmits probe signals through the probe head cable 211. The probe head 213 is secured to a coordinate measuring machine quill 217, which is attached to the end of the Z-axis movement member 224 (or a sliding element, such as a spindle) which moves in the Z-axis direction of the machine coordinate system (MCS). The probe head 213 is connected to the vision probe 300' at a probe autojoint connection 231. One implementation of a probe autojoint connection is described in more detail in U.S. Pat. No. 9,115,982, which is hereby incorporated herein by reference in its entirety.

Figure 3A:
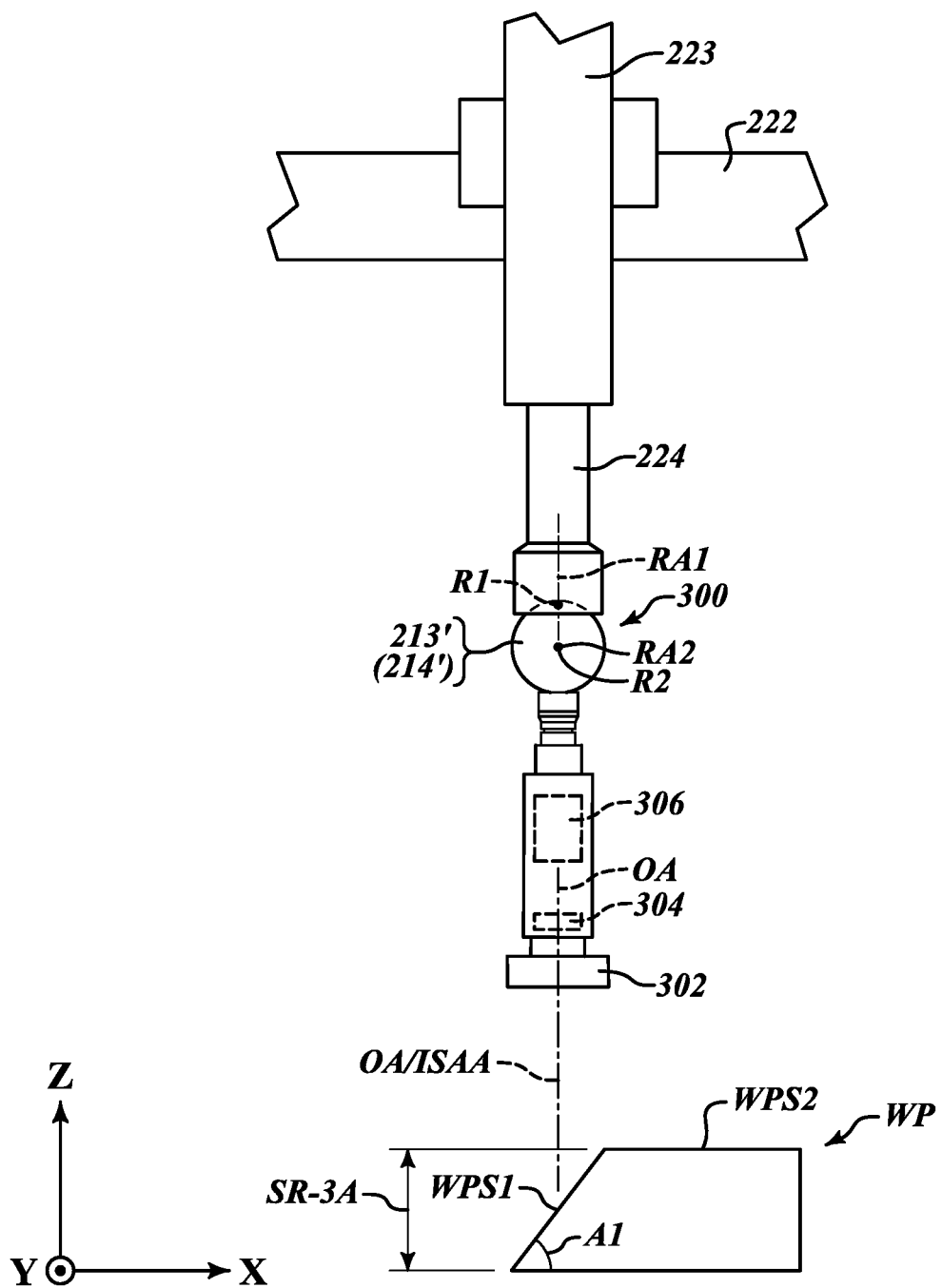
FIG. 3A is a schematic diagram of a vision probe having its optical axis (OA) oriented generally in a vertical orientation relative to a surface on which a workpiece WP is placed (i.e., the OA is parallel to the z-axis of the machine coordinate system)
Figure 3B:
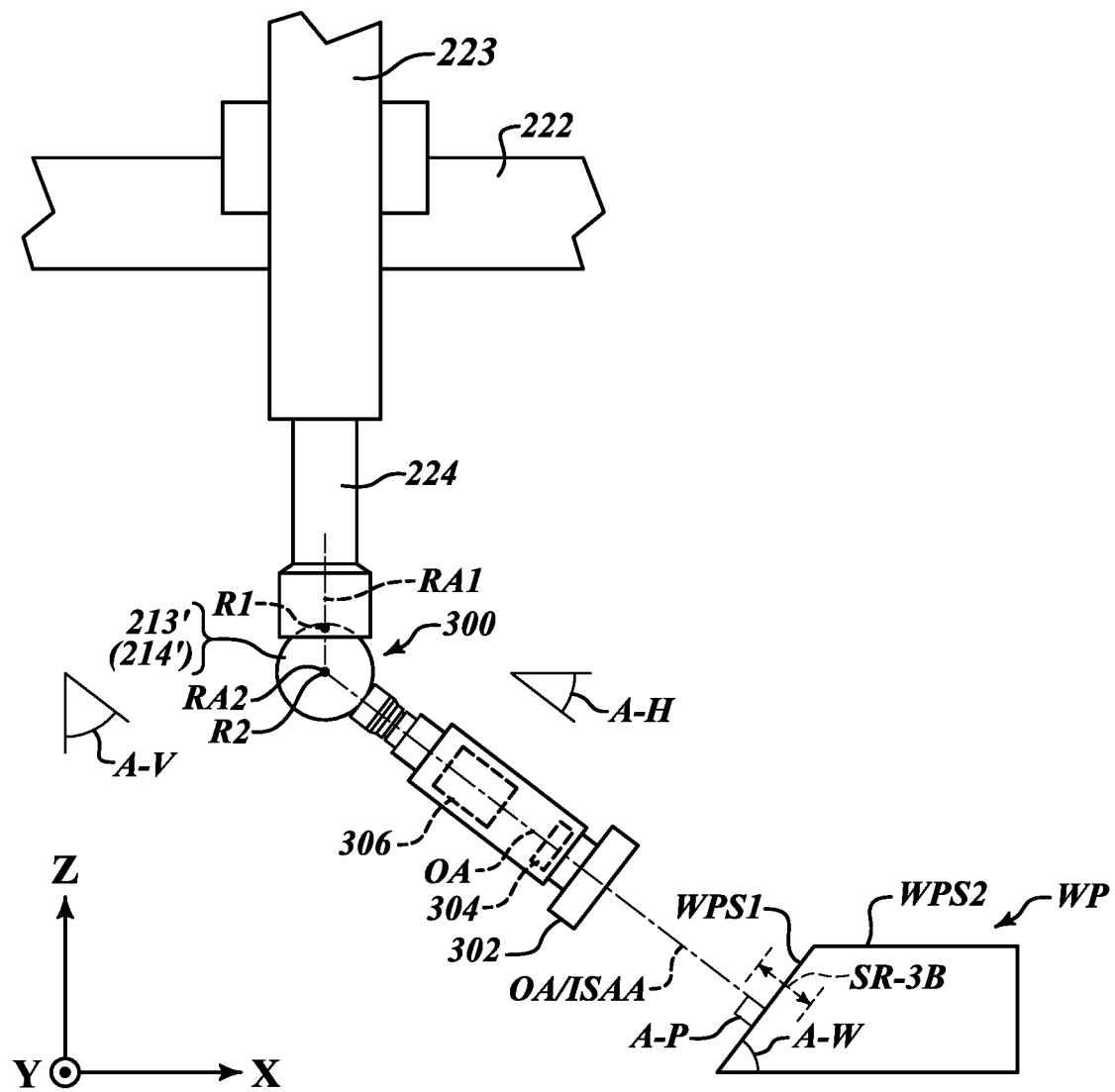
FIG. 3B is a schematic diagram of the vision probe of FIG. 3A having its optical axis (OA) oriented at an angle (i.e., not parallel to the z-axis of the machine coordinate system)

The probe head 213 includes the rotation mechanism 214 (FIG. 2) which in some implementations rotates in 360 degrees in a horizontal plane (e.g., for which angular movement/position/orientation may be sensed by a first rotary sensor 215), and may contain a type of U-joint (e.g., which enables rotation of an attached probe around a corresponding axis that lies in a horizontal plane, for which angular movement/position/orientation may be sensed by a second rotary sensor 215, as will be described in more detail below with respect to FIG. 3B). Thus, the rotation mechanism 214 of the probe head 213 in the specific example of FIG. 1B supports rotation of the vision probe 300' around two different axes: first, rotating (spinning) the vision probe 300' in the current orientation around the Z-axis and, second, rotating the vision probe 300' around a horizontal axis (i.e., an axis in an XY plane of the machine coordinate system). The rotation mechanism 214 embodied in the probe head 213, in FIGS. 3A and 3B to be described later, is essentially illustrated as a circle, although in a three dimensional representation may be illustrated as a sphere in various embodiments. The rotation mechanism 214 comprising a spherical (or ball) joint allows the vision probe 300' to rotate around, relative to the Z-axis movement member 224 within the column 223 and/or relative to any horizontal axis, so as to position the optical axis of the vision probe 300' at a desired angle/orientation relative to a workpiece surface (e.g., for which the workpiece surface may be at an angle relative to a horizontal plane). Generally, the rotation mechanism 214 is a mechanism for changing the orientation of the vision probe 300 (i.e., the attitude of the vision probe 300), as shown in FIGS. 3A and 3B.

The probe autojoint connection 231 is an electro-mechanical connection that fastens the probe head 213 rigidly and mechanically to the vision probe 300', in a way such that it can be disconnected from one probe and attached to another. In one implementation, the probe autojoint connection 231 may include first and second mating auto exchange joint elements 234 and 236, wherein the first auto exchange joint element 234 is mounted to the probe head 213, and the second mating auto exchange joint element 236 is mounted to the vision probe 300'. In one implementation, the probe autojoint connection 231 has mating electrical contacts or connections 235 so that when a probe is attached, the contacts automatically engage and make electrical connections.

The vision probe 300' may receive at least some of its power and control signals through the autojoint connection 231, for which the power and control signals are correspondingly passed through the probe head cable 211. The signals passed to the vision probe 300' through the autojoint connection 231 are passed through connections 235. As shown in FIG. 1B, the vision probe 300' includes an auto exchange joint element 236 and a probe assembly 237 that is mounted to the auto exchange joint element 236, for automatic connection to the CMM 100 through the probe autojoint connection 231.

In various implementations, the vision probe 300' may also or alternatively have at least some of its power and control signals passed through a cable 211'. In some implementations, the cable 211' may be utilized due to a standard autojoint connection 231 having a limited number of wired connections available, and for which more connections may be desirable/utilized for the vision probe 300' (e.g., as may be provided through the optional cable 211'). In various implementations, in addition to certain standard power and/or communication signals, vision probes 300' may also have additional features/capabilities that may require and/or benefit from additional power and/or communication signals that can be provided through the optional cable 211' and/or through other transmission mechanisms. In various implementations, the power and/or communication signals for the vision probe 300' (e.g., as passed through the cable 211 and/or the cable 211') may be to and from the vision probe controller 408 and the vision probe data portion 410, as will be described in more detail below with respect to FIG. 2.

As shown in FIG. 2, the machine body 200 of the CMM 100 in some embodiments may include, in addition to the vision probe 300 (300'), an optional tactile measuring probe 390 including XYZ sensor(s) 392. The tactile measuring probe 390 may be a touch probe or a scanning probe, etc., which typically has a probe tip that physically touches the workpiece being measured. In some embodiments, such a tactile measuring probe 390 may be used in addition to/in combination with the vision probe 300. For example, after the vision probe 300 is used to obtain an image stack and determine a 3-dimensional profile of the workpiece surface, the vision probe 300 may be detached/removed from the CMM 100 (e.g., detached from the probe head 213 in FIG. 1B). The tactile measuring probe 390 may then subsequently be attached to the CMM 100 (e.g., attached to the probe head 213). To that end, in some examples, the CMM 100 may have different probes (e.g., 300, 390, etc.) stored on a probe rack and move the probe head 213 to proper position for attaching and detaching the different probes. The tactile measuring probe 390 may then be used to physically touch and verify certain measurements or surface points (e.g., for surface points that may have been difficult to view/determine utilizing the vision probe 300). In various implementations, if there are surface points on the workpiece surface that may have been difficult to image/capture and/or were partially hidden from the view by other parts of the workpiece from the vision probe 300, the tactile measuring probe 390 may be utilized to physically touch such surface points for a measurement.

Still referring to FIG. 2, the vision probe 300 may include a lighting configuration 302, an objective lens 304, and a camera 306. In the illustrated embodiment, the objective lens 304 and camera 306 are inside the vision probe 300, and are illustrated with dotted line boxes in some of the figures (e.g., FIGS. 3A and 3B). In various implementations, the objective lens 304 may be a multi-lens optical element and may be chosen with a range of magnifications. For example, different objective lenses with different magnifications may be available for selection, and an objective lens to be utilized in the vision probe may be selected based on a desired magnification for certain applications (e.g., for which an objective lens with a relatively higher magnification may be selected to provide relatively higher resolution with a tradeoff of a smaller range of PFF images, etc.)

In the embodiment of FIGS. 3A and 3B, the lighting configuration 302 may be a ring light (e.g., as formed from an arrangement of LEDs) provided at the distal end of the vision probe 300, though the arrangement of the lighting configuration 302 is not limited to the illustrated embodiment. For example, the lighting configuration 302 may be provided alternatively as a coaxial light. Providing a coaxial light in some implementations may require a different configuration with a beam splitter in the optical axis path within the vision probe 300 for directing light down through the objective lens 304, and with a light source off to the side or otherwise positioned within the vision probe 300 for directing light to the beam splitter, etc. In certain implementations, the lighting configuration 302 formed of a ring light (e.g., an arrangement of LEDs) may have less weight and smaller size and dimensions than a lighting configuration 302 formed of a coaxial light (which may require a beam splitter as well as a light source off to the side).

As described above in reference to FIG. 1B, the optional probe head cable 211' may be utilized to carry additional signals (e.g., for controlling and/or providing power to the vision probe 300 for the lighting configuration 302, the camera 306, etc.) or alternatively, the cable 211' need not be included, in which case all of the required lines/signals may pass through the probe head 213 (e.g., thus passing through the cable 211).

When utilized with just the vision probe 300, the CMM movement mechanism configuration 220, in particular the sensors thereof (215 and 228-230), may provide measurement outputs M to the position determination portion 406, which determines the position of the probe head 213 (or other connection point or reference position) of the vision probe 300 within the CMM's machine coordinate system (MCS). For example, the position determination portion 406 may provide the X, Y and Z coordinates within the machine coordinate system for the probe head 213 or other connection point or reference point of the vision probe 300. When the tactile measuring probe 390 is attached, the tactile measuring probe 390 may include a mechanism that allows the probe tip to move (in small amounts) relative to the rest of the tactile measuring probe 390, and corresponding sensors (e.g., the XYZ sensors 392) that provide sensor data which indicates the position of the probe tip (i.e., a probe stylus tip) that is actually touching the workpiece surface in a local coordinate system of the tactile measuring probe 390. Measurement synchronization trigger signals (e.g., provided in relation to the operations of the position latch 216, etc.) trigger measurements that track an overall position and orientation of the tactile measuring probe 390 (e.g., of the probe head 213) in the machine coordinate system, as well as triggering a local surface measurement using the tactile measuring probe 390 in the local coordinate system. The position determining portion 406 may use and combine the coordinates measured in the local coordinate system and the position of the tactile measuring probe 390 measured in the machine coordinate system to determine the overall position of the probe tip and, thus, the measured/detected surface points on the workpiece.

In contrast to such determinations utilizing the tactile measuring probe 390, when the vision probe 300 is utilized as described herein with respect to various exemplary embodiments, the position determination portion 406 may only determine the position of the probe head 213 at the top of the vision probe 300 (or other reference or attachment position). In order to determine coordinates of surface points on a workpiece, the information from an analysis of an image stack may be used. For example, the image stack (of images at different focus positions) may be acquired by the vision probe 300, wherein the relative locations/focus positions of the images in the image stack are in terms of the probe coordinate system (PCS), which in some implementations may be in relation to the reference position of the probe within the MCS. In order to determine the overall position of the surface points within the machine coordinate system (MCS), the PCS position data of the surface points may in some implementations be converted and/or otherwise combined with the MCS position data, to thereby determine the total overall positions of the surface points.

When the vision probe 300 is oriented at an angle (e.g., as illustrated in FIG. 3B) and thus the probe coordinate system (PCS) has a Z-axis that is oriented at an angle (i.e., corresponding to the optical axis of the vision probe 300), an acquired image stack indicates the relative distances of the surface points of the workpiece along the direction of the probe Z-axis which is oriented at the angle. Those probe coordinate system (PCS) coordinates may in some implementations be referenced as a local coordinate system, which then may be combined with (e.g., converted and added to) the MCS coordinates determined for the probe head 213 (or other reference position) in order to determine the overall positions of the surface points on the workpiece within the MCS. For example, if it is desired to determine the coordinates of the surface points in terms of the MCS, the determined measurement points in the probe coordinate system PCS may be converted to MCS coordinates and added to the other MCS coordinates of the probe head 213 (or other reference position) of the vision probe 300. Alternatively, if the workpiece itself is assigned its own local coordinate system (LCS), the MCS coordinates determined for the probe head 213 (or other reference position) of the vision probe 300 may be converted or combined with the LCS of the workpiece. As yet another example, in some instances other local coordinate systems may also or alternatively be established (e.g., for the images of the image stack, etc.) In general, the MCS covers the overall large volume of coordinates of the CMM 100, while an LCS (e.g., such as the PCS), generally covers a smaller volume and in some instances may generally be contained within the MCS. In various implementations, in addition to X, Y and Z coordinates, certain types of cylindrical coordinates, Cartesian coordinates, or other coordinates may also or alternatively be utilized with respect to the orientation of the vision probe 300 and the determination of the coordinates of measured surface points on the workpiece WP.

In some implementations, the position data in terms of the PCS from the image stack may be utilized relatively independently (e.g., with limited or no conversion or combination with the coordinates from the MCS or other coordinate systems). For example, the position data determined from the analysis of the image stack may provide 3D coordinates indicating 3D positions of surface points on a workpiece surface in terms of the PCS or other LCS, which thus represent/correspond to a 3D profile/surface topography of the workpiece surface. As noted above, in some implementations such data may be combined with other position data represented in the MCS to indicate the overall position of the workpiece surface and surface points within the MCS. However, for certain implementations/analysis/representations/etc., it may be desirable to primarily or only utilize the position data determined from the image stack. For example, if an analysis or inspection is primarily directed to determining the relative locations and/or characteristics of workpiece features on a workpiece surface (e.g., in relation to the distances between such workpiece features on the workpiece surface and/or the 3D dimensions of the workpiece features on the surface, etc.), in some implementations such data may primarily be determined from the analysis of the image stack. More specifically, if the overall position(s) within the MCS of the workpiece surface and/or workpiece features is/are not required for the desired analysis/inspection, the data determined from the image stack may be utilized with limited or no combination with other MCS or other coordinate system coordinates. In addition to analysis of such data, it will be appreciated that a 3D representation of the workpiece surface may similarly be provided (e.g., on a display, etc.) in accordance with the data from the analysis of the image stack.

As illustrated in FIG. 2, the vision probe controller 408 controls the vision probe 300 (e.g., controlling the lighting configuration 302 and the camera 306, etc. for obtaining images of an image stack, etc.). In various implementation, the vision probe controller 408 does not have to control the movement or focusing of the vision probe 300. Instead, those aspects may be controlled by the CMM movement mechanism configuration 220, which moves the vision probe 300 closer and/or further from the workpiece in order to obtain an image stack (i.e., moves the vision probe 300 to each image acquisition position, as illustrated/described with respect to FIGS. 4 and 5 below), wherein the rotation mechanism 214 may be utilized for rotating the vision probe 300 to be at a desired angle/orientation. In various implementations, a focus distance of the vision probe 300 may be primarily determined by the objective lens 304 (e.g., for which the focus distance in front of the vision probe 300 may be constant during measurement operations as corresponding to the objective lens 304 that is selected/utilized in the vision probe 300). The vision probe data portion 410 receives the output of the vision probe 300 (i.e., the image data for the images of the image stack). The analyzer portion 412 may be utilized to perform the associated analysis (e.g., the points-from-focus (PFF) analysis or other analysis of the image stack for determining the relative location of each of the surface points on the workpiece surface along the probe Z-axis direction, so as to determine a 3-dimensional surface profile of the workpiece surface, etc., as will be described in more detail below with respect to FIGS. 6A and 6B). The storage portion 414 may comprise a portion of a computer memory for storing certain software, routines, data, etc., for the operation of the processing device configuration 110, etc.

FIGS. 3A and 3B illustrate certain components relative to FIGS. 1A-2, including certain parts of the movement mechanism configuration 220 including the rotation mechanism 214' (embodied in the probe head 213') of the machine body 200 of the CMM 100. FIG. 3A illustrates the vision probe 300 in a vertical orientation (e.g., similar to how certain prior art systems, such as certain vision systems, have primarily been operated to only move a focusing position up and down along a Z-axis direction of a machine coordinate system in order to obtain an image stack including images of a workpiece). As shown in FIG. 3A the workpiece WP has a workpiece surface WPS1 that has an angular orientation (at angle A1). It is noted that the machine coordinate system's Z-axis is parallel to the optical axis OA of the vision probe 300 in the illustration of FIG. 3A. It will be appreciated that the optical axis (Z-axis) of the vision probe 300 may be in a same direction as the machine coordinate system's Z-axis and an image stack acquisition axis ISAA if the vision probe 300 is simply moved up and down along the Z-axis of the MCS by the Z-axis slide mechanism 227 (including movement of the Z-axis movement member 224 within the column 223). The workpiece surface WPS1 is shown to be at angle A1 relative to a horizontal plane of the MCS. In contrast, a workpiece surface WPS2 of the workpiece WP is shown to be approximately parallel to the horizontal plane.

FIG. 3B illustrates the vision probe 300 at an angle relative to both a horizontal plane of the MCS (at angle "A-H") and a vertical plane of the MCS (at angle "A-V"), in accordance with various embodiments of the present disclosure, as can be achieved with the CMM 100 as disclosed. As will be described in more detail below, the CMM 100 is capable of operating its three slide mechanisms (i.e., X-axis, Y-axis and Z-axis slide mechanisms 225-227, which are orthogonal to one another and each produce movement only along the respective orthogonal X, Y and Z axes/directions of the MCS) and the rotation mechanism 214' (embodied in the probe head 213') for moving/orienting the vision probe 300. The CMM 100 can thus freely move the vision probe 300 relative to the workpiece WP, along multiple axes simultaneously including rotation about an arbitrary axis, in order to obtain an image stack at a designated angle. More generally, the movement mechanism configuration 220 (including the X, Y and Z slide mechanisms 225-227 and the rotation mechanism 214') supports and enables the vision probe 300 to move in mutually-orthogonal X, Y and Z directions and to be at a desired angle/orientation relative to the workpiece surface to be measured.

In the illustrated example of FIG. 3B, the vision probe 300 has been rotated (e.g., by a U joint or other component of the rotation mechanism 214' of the probe head 213') around a horizontal rotation axis RA2 passing through the rotation point R2 so as to be pointed at an angle A-H, and for which the optical axis OA of the vision probe 300 is approximately perpendicular to a workpiece surface WPS1. In FIG. 3B, the ability of the rotation mechanism 214' of the probe head 213' to rotate the vision probe 300 around the Z-axis of the machine coordinate system is illustrated by a rotation axis RA1 passing through a rotation point R1 at the top of the probe head 213'/rotation mechanism 214'. The rotation around a horizontal axis is illustrated in accordance with the rotation axis RA2 (i.e., indicated as a single point since it is directed into the page) as passing through the rotation point R2 at the center of the probe head 213'/rotation mechanism 214' (e.g., in accordance with the operation of the U joint as illustrated in FIG. 1B).

In FIG. 3B, an example image stack range SR-3B is illustrated for determining a 3-dimensional surface profile of the workpiece surface WPS1. The workpiece surface WPS1 may have various workpiece features (e.g., surface features) that may be higher or lower than an average plane location of the workpiece surface WPS1, as will be described in more detail below with respect to FIG. 7A. In some implementations, it may be desirable to have the range of respective focus positions of the image stack extend for a certain distance above and below the workpiece surface. As illustrated in FIG. 3B, the example image stack range SR-3B may be significantly smaller than an image stack range SR-3A of FIG. 3A (i.e., the image stack range required to cover all of the surface points of the workpiece surface WPS1 in the illustrated orientation of FIG. 3A), due to the fact that the vision probe 300 in FIG. 3B is oriented such that its optical axis OA is approximately perpendicular to the workpiece surface WPS1, as contrasted with the orientation in FIG. 3A. In FIG. 3B, an angle of the optical axis OA (and the image stack acquisition axis ISAA) relative to at least a portion of the workpiece surface WPS1 is indicated as "A-P," which is approximately 90 degrees/perpendicular in the illustrated example. FIG. 3B also illustrates an angle of the workpiece surface WPS1 relative to a horizontal plane, "A-W" (e.g., as corresponding to angle A1 of FIG. 3A). Depending on a particular angle A-W in each implementation, the rotation mechanism 214' may be adjusted to ensure the optical axis OA (and ISAA) of the vision probe 300 is approximately perpendicular to at least a portion of the workpiece surface WPS1, as will be described in more below with respect to FIGS. 7A-7C.

Figure 4:
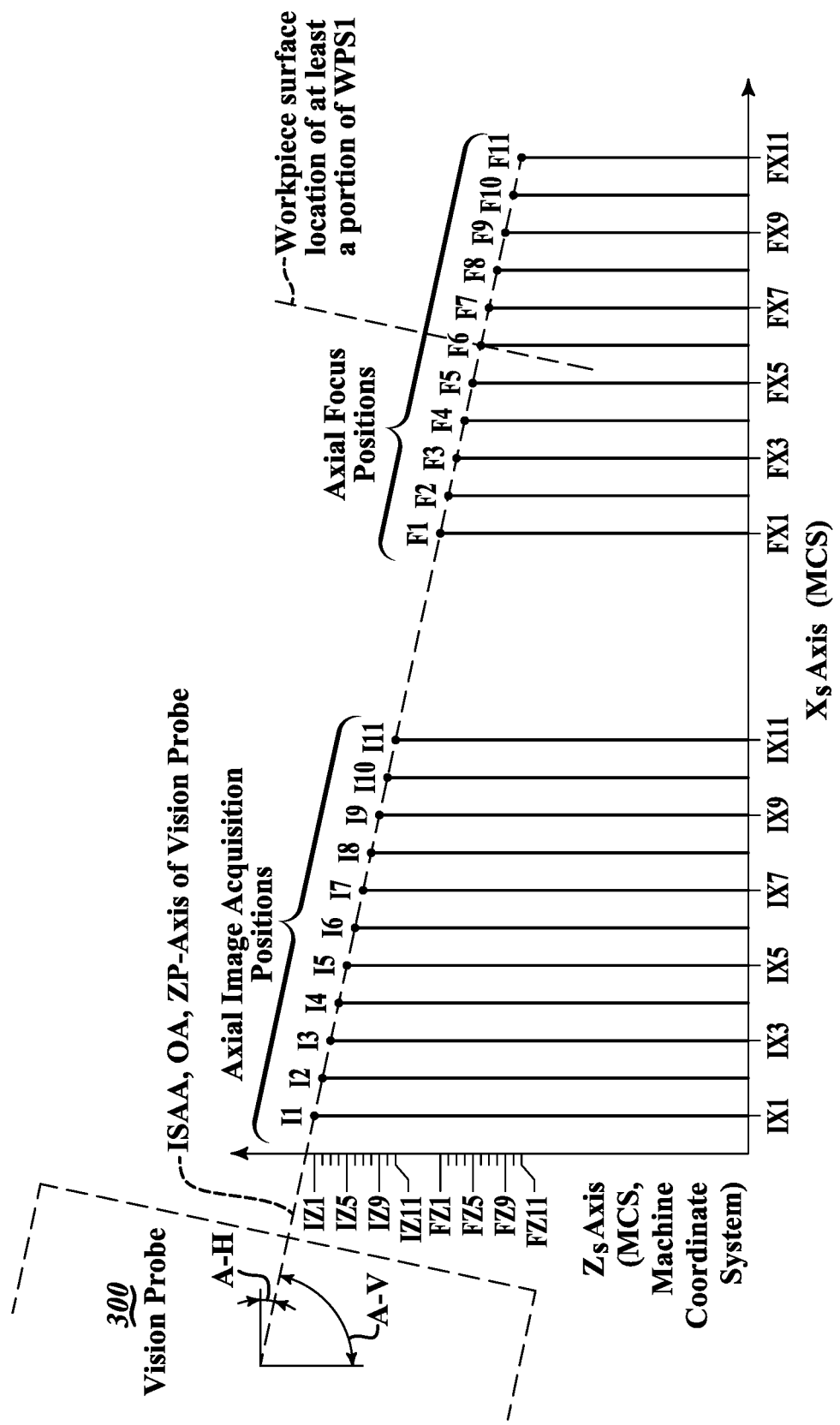
FIG. 4 is a graph illustrating a 2-dimensional perspective of a movement of the vision probe along the machine coordinate system x-axis direction and z-axis direction for obtaining images at image acquisition positions (I)
Figure 5:
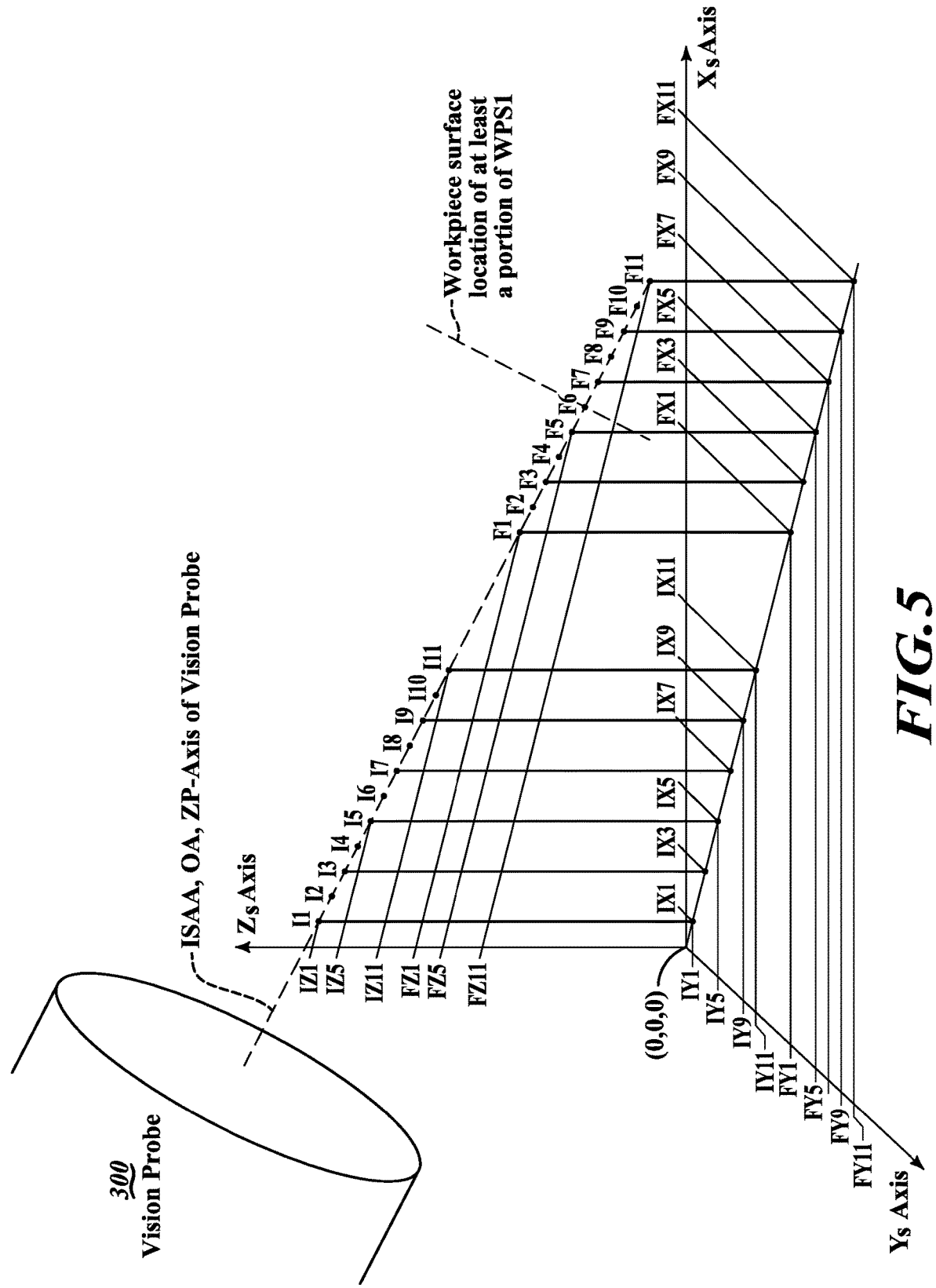
FIG. 5 is a graph illustrating a 3-dimensional perspective of a movement of the vision probe along the machine coordinate system x-axis direction, y-axis direction, and z-axis direction for obtaining images at image acquisition positions (I)

FIG. 4 illustrates a 2-dimensional perspective and FIG. 5 illustrates a 3-dimensional perspective of a movement of the vision probe 300 for obtaining an image stack (e.g., including eleven images as one example, as illustrated and described in more detail below with respect to FIGS. 6A and 6B). As shown in FIGS. 4 and 5, in one specific example, the vision probe 300 may be moved through at least eleven axial image acquisition positions I1-I11, in order to acquire eleven images with corresponding axial focus positions F1-F11. It will be appreciated that each of the axial focus positions F1-F11 may be located along the image stack acquisition axis (ISAA) of the vision probe 300.

FIGS. 4 and 5 illustrate 2-dimensional and 3-dimensional coordinates of each of the axial image acquisition positions I1-I11 and the axial focus positions F1-F11. In general, certain prior art systems which have acquired image stacks have done so only in the vertical direction (i.e., only along the Z-axis of a machine coordinate system). More specifically, in accordance with prior art techniques, an imaging system (e.g., a machine vision system, etc.) may be configured to move the focusing position of the system up and down along a vertical Z-axis, which corresponds to the Z-axis of a machine coordinate system. On the other hand, in accordance with the present disclosure, the specified orientation for acquiring an image stack is not so limited. As illustrated herein, an image stack may now be acquired at an angle, using the components of the CMM 100 in combination with the vision probe 300 as disclosed. Thus, in accordance with the present disclosure, instead of referring to the "Z-axis" of the machine coordinate system as a default optical axis for image acquisition as in the prior art, the optical axis of the vision probe 300, which can be arranged and oriented in any direction and at any angle to acquire an image stack, may in some instances correspond to and/or be referred to as an "image stack acquisition axis" (ISAA or ISA axis).

Referring to FIG. 4, in general, an ISA axis (ISAA) may be established at the start of a process for acquiring an image stack. Then, the vision probe 300 may be moved to each new position along the ISA axis for acquiring an additional image. For the acquisition of each additional image of the image stack, the optical axis OA of the vision probe 300 may be coaxial with the ISA axis. Due to the fact that the movement of the vision probe 300 typically requires individual adjustments of the X, Y and Z slide mechanisms 225-227 (e.g., which in various implementations may or may not be all moved simultaneously or proportionally), during such micro adjustments between the image acquisition positions, the movement of the vision probe 300 may therefore not always be exactly along the ISA axis. However, once the movement is completed such that the vision probe 300 is moved to the next axial image acquisition position for acquiring a next image, that axial image acquisition position may be along the ISA axis. Further, each axial focus position F1-F11 (i.e., corresponding to the focus position of each acquired image) may also be along the ISA axis.

The prior art imaging systems described above, which use only a single slide mechanism (e.g., a Z-axis slide mechanism) for acquiring an image stack, may in some instances be configured to perform specialized imaging and, thus, may be less common and relatively expensive. In contrast, a CMM including X, Y and Z-axis slide mechanisms is relatively common and widely utilized. In accordance with the present disclosure, the CMM is utilized to move the vision probe 300 to acquire an image stack at any orientation or angle, which provides greater flexibility with utilizing a standard CMM in various exemplary implementations. In addition, the configuration with the X, Y and Z-axis slide mechanisms 225-227 and the rotation mechanism 214 may be highly accurate due to the inclusion of highly accurate X, Y and Z-axis scale sensors 228-230 for each of the slide mechanisms and the rotary sensor(s) 215 (e.g., including rotary encoders and/or other types of relative position sensors) for the rotation mechanism 214. In various exemplary implementations, the overall position determination within the MCS for each of the corresponding X, Y and Z coordinates may be relatively simple to carry out and highly accurate at the same time, due in part to the direct correlation of each X, Y, Z sensor with a single coordinate axis (and a corresponding single coordinate) in the MCS.

FIGS. 4 and 5 illustrate examples of the X, Y and Z coordinates in the machine coordinate system for each of the movements of the vision probe 300 to the image acquisition positions I1-I11. In various implementations, the machine coordinate system x-axis, y-axis and z-axis may be referenced as the $X_S$ axis, $Y_S$ axis and $Z_S$ axis, respectively. The image acquisition positions I1-I11, where the vision probe 300 is positioned to capture the eleven images of the image stack (images(1)-(11) in FIG. 6B), correspond to the axial focus positions F1 to F11 where the vision probe 300 is focused for the capture of the eleven images of the image stack. In the illustrated example, all of the image acquisition positions I1-I11 and the axial focus positions F1-F11 are along the image stack acquisition axis (ISAA). For the image stack 650 of FIG. 6B, when the vision probe 300 is at image acquisition position I1, it is focused at axial focus position F1 for capturing image(1) of the image stack.

More specifically, as illustrated in FIG. 4, for the image acquisition position I1, the corresponding MCS coordinates of a reference position for the vision probe 300 are at IX1 and IZ1. In a next image acquisition position I2, the MCS coordinates may be IX2 and IZ2. At a next image acquisition position I3, the MCS coordinates may be IX3 and IZ3. For the remaining image acquisition positions I4-I11, the corresponding MCS coordinates of the reference position for the vision probe 300 are similarly at IX4-IX11 and IZ4-IZ11, respectively. In order for the vision probe 300 to be moved from image acquisition position I1 to the image acquisition position I2, the X-axis slide mechanism 255 is adjusted for the movement from IX1 to IX2. Similarly, the Z-axis slide mechanism 227 is adjusted for the movement from IZ1 to IZ2. In relation to FIG. 5, for the image acquisition position I1, the corresponding MCS coordinates are at IX1, IY1 and IZ1. In a next image acquisition position I2, the MCS coordinates may be IX2, IY2 and IZ2. At a next image acquisition position I3, the MCS coordinates may be IX3, IY3 and IZ3. In order for the vision probe 300 to be moved from image acquisition position I1 to the image acquisition position I2, the X-axis slide mechanism 255 is adjusted for the movement from IX1 to IX2. Similarly, the Y-axis slide mechanism 226 is adjusted for the movement from IY1 to IY2, and the Z-axis slide mechanism 227 is adjusted for the movement from IZ1 to IZ2. Similar movements are performed for the movements to the remaining image acquisition positions.

In some implementations, such adjustments of the slide mechanisms 225-227 may be relatively simultaneous such that the vision probe 300 may generally move along the image stack acquisition axis (ISAA) in its movement between the image acquisition positions I1 and I2. However, the movements of the various slide mechanisms 225-227 need not be precisely proportional or simultaneous during the overall movement, and the movement of the vision probe 300 between the positions may not be entirely centered along the ISA axis. That is, unlike the prior art systems which utilize a single slide mechanism resulting in movement that is always precisely along the image stack acquisition axis, the movements of the various slide mechanisms 225-227 according to various embodiments of the present disclosure may result in determinations and/or combinations of movements along multiple axes. However, in various exemplary implementations, at the end of the overall movement from the position I1, the vision probe 300 will be positioned at the position I2, which is along the ISA axis and/or otherwise with the optical axis of the vision probe 300 coaxial with the ISA axis.

As will be described in more detail below, in some implementations it may be desirable to have a focus position of at least a portion of the workpiece surface WPS1 correspond approximately to a focus position in the middle of the range of focus positions of the image stack. For example, in the illustrated image stack of eleven (11) images with corresponding focus positions F1 to F11, it may be desirable to have at least a portion of the workpiece surface be approximately in focus at approximately the axial focus position F6, as corresponding approximately to a middle of the range of the image stack, as will be described in more detail below with respect to FIGS. 6A and 6B. As described herein, it may also be desirable for at least a portion of the workpiece surface WPS1 (and/or a general or average angular orientation of the workpiece surface or a portion thereof) to be approximately/nominally perpendicular to the ISA axis, as shown in FIGS. 4 and 5. Such features were also described previously with respect to the potential scan ranges SR in FIGS. 3A and 3B, and will be described in more detail below with respect to scan ranges SR1 and SR2 of FIGS. 7B and 7C. More specifically, in accordance with the present disclosure, by orienting the vision probe 300 such that the image stack acquisition axis (ISAA) is approximately perpendicular to at least a portion of the workpiece surface (WPS1) that is being imaged, the range of the image stack may be able to be relatively shorter while still covering all of the range of surface points of the 3-dimensional workpiece features (i.e., corresponding to 3-dimensional surface characteristics and deviations) with a high degree of accuracy.

FIGS. 6A and 6B illustrate how an image stack obtained by the vision probe 300 according to the present disclosure may be utilized to determine a ZP position of a point on a workpiece surface, along a ZP-axis which may be approximately/nominally perpendicular to the workpiece surface. As used herein, "ZP-axis" may correspond to a z-axis of a probe coordinate system and/or an optical axis of the vision probe 300 which, when the vision probe 300 is angled or tilted, may not coincide with the z-axis of the MCS. In various implementations, the image stack is obtained by the CMM 100 operating in a points-from-focus (PFF) mode (or similar mode), to determine a ZP-height (ZP-position) of the workpiece surface along an axis approximately perpendicular to the workpiece surface. The PFF image stack may be processed to determine or output a ZP height coordinate map (e.g. a point cloud) that quantitatively indicates a set of 3 dimensional surface coordinates (e.g., corresponding to a surface shape or profile of the workpiece).

Specifically, FIGS. 6A and 6B illustrate operations associated with determining, for a point on a surface of a workpiece, a relative ZP-position along a direction of an image stack acquisition axis (e.g., parallel to the ZP-axis of the vision probe 300 or of the probe coordinate system (PCS)). In a configuration where the image stack acquisition axis ISAA is parallel to the Z-axis of the machine coordinate system, the relative position has in certain prior systems been referenced as corresponding to a Z-height of the surface point, although more generally the image stack acquisition axis ISAA may be oriented in any direction, as disclosed herein.

As indicated in FIGS. 6A and 6B, a focus position may move through a range of positions Zp(i) along a direction of an image stack acquisition axis ISAA, which may correspond to the focusing axis at each image acquisition position. The vision probe 300 may capture an image(i) at each position Zp(i). For each captured image(i), a focus metric fm(k,i) may be calculated based on a region or sub-region of interest ROI(k) (e.g. a set of pixels) in the image (e.g., with the corresponding surface point at the center of the region or sub-region of interest ROI(k)). The focus metric fm(k,i) is related to the corresponding position Zp(i) of the vision probe 300 and the corresponding focus position, along the direction of the image stack acquisition axis ISAA at the time that the image(i) was captured. This results in focus curve data (e.g. a set of the focus metrics fm(k,i) at the positions Zp(i), which is one type of focus peak determining data set), which may be referred to simply as a "focus curve" or "autofocus curve". In one embodiment, the focus metric values may involve a calculation of the contrast or sharpness of the region of interest in the image.

The ZP-position (e.g. $Z_p$k601 in FIG. 6A) corresponding to the peak of the focus curve, which corresponds to the best focus position along the image stack acquisition axis, is the ZP position for the region of interest used to determine the focus curve. It will be appreciated that while the image stack is shown for purposes of illustration as including eleven images (image(1)-image(11)), in an actual embodiment a smaller or larger number of images (e.g. 100 or more) may be utilized.

As indicated by the focus curve generated for images(1)-(11), in the illustrated example, image(6) appears to be close to or at the best focus (e.g., a feature in the middle in ROI(1) (not shown) would appear to be most in focus in image (6), as compared to in other images where the workpiece surface would appear to be progressively more out of focus for images further from image (6), and may appear more and more blurred). When a focus metric value is based on contrast as noted above, one method includes comparing a central pixel of an ROI with its neighboring pixels in the ROI in terms of color/brightness, etc. By finding the image with the highest overall contrast, which corresponds to a focus position of when the image was acquired, an indication/measurement of the relative ZP-position of a surface point (e.g., at the center of the ROI) can be obtained along the optical axis OA and the image stack acquisition axis ISAA.

In FIG. 6B as described above, a central region of interest ROI(1) is deemed to be approximately in focus at image(6), which corresponds to position Zp(6) along the optical axis of the vision probe 300. The optical axis corresponds to the Zp axis in the probe coordinate system (PCS) and may also be coaxial with the image stack acquisition axis ISAA when the vision probe 300 is utilized to acquire each image. In this manner, the surface point on the workpiece surface that corresponds to the center of the ROI(1) may be determined to be at the relative position Zp(6), as approximately corresponding to the focus position of image(6) in the image stack. It will be appreciated that the determined peak focus position in some instances may fall between two images in the image stack, for which the focus peak position may be determined by interpolation or other techniques in accordance with the fitting of the focus curve to the focus metric values determined for the images.

In some implementations, it may be desirable to have the images of the image stack be approximately evenly spaced within the image stack, which may help ensure an even distribution of the data points along the focus curve and/or for simplifying certain calculations (e.g., interpolation, etc.) or otherwise for assisting/improving certain algorithmic operations. However, in some instances focus curves may also be relatively accurately determined from image stacks when the images are not all evenly spaced (e.g., as may result from the X, Y and Z-axis slide mechanisms 225-227 having certain parameters/limitations in terms of the relative movements, such as how small of increments the movements may accurately be made in, etc.).

If an even spacing of all of the images in an image stack is desired, in some implementations it may be desirable to utilize certain orientations of the vision probe 300 for which the movements for acquiring the image stack can be supported by the limitations/characteristics of the particular CMM X, Y and Z-axis slide mechanisms 225-227. For example, if the X, Y and Z-axis slide mechanisms 225-227 each have a minimum movement increment (e.g., 1 um), and if a 45 degree angle were to be utilized for the ISA axis, in one example implementation each of the X, Y and Z-axis slide mechanisms 225-227 that are to be moved could be moved in a same incremental amount (e.g., 1 um) for each image acquisition position, such that the spacing between each of the images in the image stack would be the same. In accordance with similar principles, each of the X, Y and Z-axis slide mechanisms 225-227 could be moved in different amounts for each image acquisition position, but for which the X movement amount/delta could be the same for the movement between each image acquisition position, the Y movement amount/delta could be the same for the movement between each image acquisition position, and the Z movement amount/delta could be the same for the movement between each image acquisition position. In accordance with such movements, the image acquisition positions will correspond to and/or define the image stack acquisition axis ISAA, for which the probe orientation can be made such that the optical axis OA of the vision probe 300 may be approximately/nominally coaxial with the image stack acquisition axis ISAA at each of the image acquisition positions.

In accordance with similar principles, if there are minimum increments for the adjustments of the angular orientation of the vision probe 300 (e.g., in accordance with minimum achievable increments/adjustments of movement of the rotation mechanism(s) 214 for adjusting the angular orientation of the vision probe 300), the movements of the X, Y and Z-axis slide mechanisms 225-227 may also be made to have the ISAA correspond to such angular orientations. In some implementations, for the overall system, desirable orientations of the vision probe 300 which best/most accurately align the optical axis OA of the vision probe 300 with the image stack acquisition axis ISAA may be found based at least in part on the minimum increments of movement of the rotation mechanism(s) 214 and/or the X, Y and Z-axis slide mechanisms 225-227. Specifically, such desirable orientations of the vision probe 300 to capture image stacks may be found in accordance with the movement/adjustment capabilities of the CMM 100 for adjusting the position/angular orientation of the vision probe 300. In one specific example implementation, a 45 degree angle (or trigonometrically similar angle such as a 135, 225 or 315 degree angle) for the orientation of the vision probe 300 (e.g., relative to a horizontal or vertical plane, such as one or more of the XY, XZ and/or YZ planes of the MCS) may be utilized in some instances in accordance with the above described principles/examples.

In further regard to FIG. 6B, a region of interest ROI(2) is illustrated as positioned diagonally relative to the region of interest ROI(1). As an example, if the region of interest ROI(2) is not in focus at any point within the 11 images of the example image stack 650, in order to find a focus position of a surface point corresponding to ROI(2), additional images may need to be evaluated and/or the range of the image stack may need to be extended (e.g., so as to acquire an image stack with a greater number of images and a greater corresponding range of focus positions). In some implementations, image stacks with 100 or more images may often be acquired/utilized. For example, in reference to FIG. 7A, the surface point that is centered in the middle of the ROI(1) may be at the bottom of the cylindrical hole that is the workpiece feature WPF1, whereas the surface point that corresponds to the ROI(2) may be at the top edge of the cylindrical hole, for which a larger image stack range with additional images may be needed/utilized (e.g., for covering all of the surface points of the workpiece feature WPF1 of the workpiece surface WPS1).

Figure 7A:
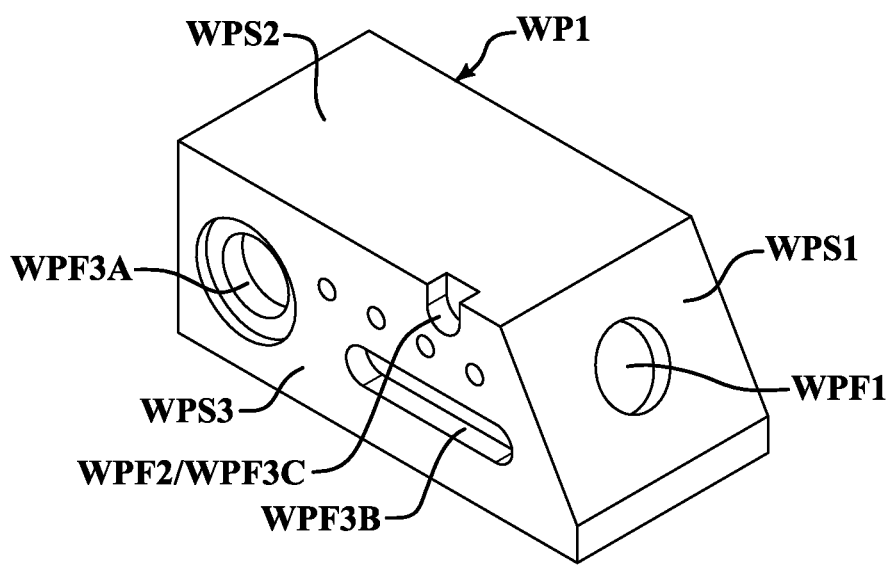
FIG. 7A illustrates a sample workpiece including a plurality of workpiece surfaces and workpiece features.

FIG. 7A illustrates a sample workpiece WP1 having various workpiece surfaces WPS1, WPS2, WPS3 and workpiece features WPF1 (which is a hole defined in the workpiece surface WPS1), WPF2/WPF3C (which are certain geometric characteristics defined on an edge interface between the workpiece surfaces WPS2 and WPS3), and WPF3A and WPF3B (both holes defined in the workpiece surface WPS3). As described above in reference to FIG. 3B, a workpiece surface or a workpiece feature to be measured is to be located within the image stack range SR-3B for determining a 3-dimensional surface profile of the workpiece surface or the workpiece feature. As shown in FIG. 7A, various workpiece features include surfaces that may be higher or lower than a general or average plane of the workpiece surface on which the workpiece features are defined. Thus, in various implementations, imaging of a workpiece feature may require use of an image stack range (or a scan range SR) that is sufficiently large to cover all of the surfaces/surface points of the workpiece feature at different ZP-heights.

Figure 7B:
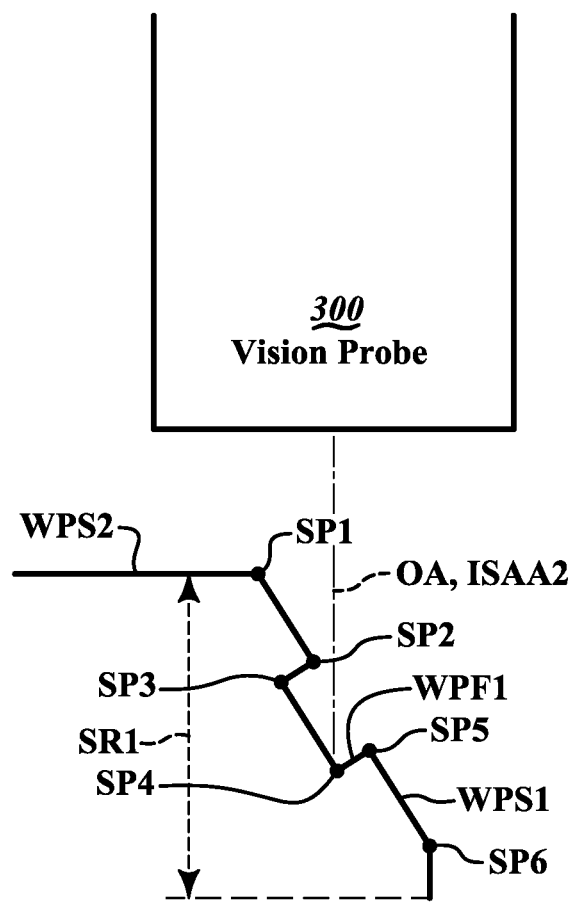
FIG. 7B is a schematic diagram of a vision probe having its optical axis (OA) and image stack acquisition axis (ISAA) oriented generally in a vertical orientation (i.e., the OA/ISAA is parallel to the z-axis of the machine coordinate system)
Figure 7C:
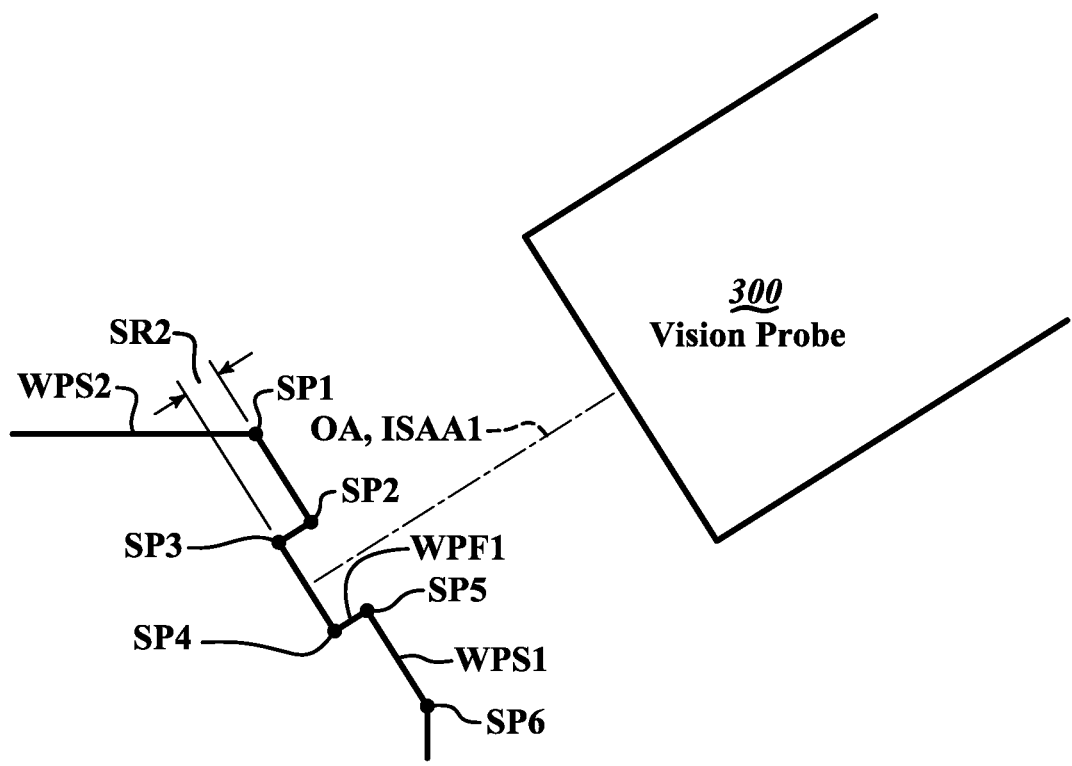
FIG. 7C is a schematic diagram of the vision probe having its optical axis (OA) and image stack acquisition axis (ISAA) oriented at an angle so as to be approximately perpendicular to an angled workpiece surface of the workpiece of FIG. 7A.

FIG. 7B is a schematic diagram showing a distal end of the vision probe 300 having its optical axis OA and image stack acquisition axis ISAA oriented generally in a vertical orientation relative to a surface on which the workpiece WP1 having the angled workpiece surface WPS1 including the workpiece feature WPF1 is placed (i.e., in parallel to the z-axis of the MCS). FIG. 7C is a schematic diagram of the distal end of the vision probe 300 having its optical axis OA and image stack acquisition axis ISAA oriented at an angle so as to be approximately/nominally perpendicular to the angled workpiece surface WPS1 of the workpiece WP1.

In general, FIGS. 7B and 7C may be understood to illustrate a desired scan range (of FIG. 7C, for example, as compared to FIG. 7B) for covering the 3-dimensional surface topography of the workpiece surface WPS1, depending on the orientation of the vision probe 300 relative to the workpiece surface WPS1 to be measured. For example, the scan range SR1 with the orientation of FIG. 7B is significantly larger, so as to be able to cover the 3-dimensional surface topography of the workpiece surface WPS1 (e.g., including the workpiece feature WPF1), as compared to the scan range SR2 with the orientation of FIG. 7C. Thus, adjusting the angle/orientation of the vision probe 300 as in FIG. 7C, so that the optical axis OA is approximately perpendicular to the workpiece surface WPS1 and/or workpiece feature WPF1, may be technically advantageous in reducing the required scan range, which in turn may shorten the scanning time and/or reduce the number of images required to form an image stack (e.g., with a desired density of images).

As illustrated in FIG. 7B, in addition to the scan range SR1 for an image stack being significantly larger than the scan range SR2 of FIG. 7C, the orientation of the vision probe 300 is at a relatively sharp angle relative to the workpiece surface WPS1, which may reduce the imaging quality or prevent the imaging of certain portions/aspects of the workpiece feature WPF1. For example, the sharp angle may reduce the quality of the imaging due to less of the imaging light being reflected back toward the vision probe 300, etc. As another example, in FIG. 7B the upper corner at surface point SP3 of the bottom of the cylindrical hole workpiece feature WPF1 is illustrated as not being viewable by the vision probe 300 (i.e., the upper edge of the cylindrical hole blocks the view of the corner at surface point SP3 of the cylindrical hole in the illustrated orientation). In contrast, in FIG. 7C, by orienting the vision probe 300 to be approximately perpendicular to at least a portion of the workpiece surface WPS1 and/or workpiece feature WPF1, the vision probe 300 may have a better angle for imaging various workpiece features (e.g., WPF1) on the workpiece surface WPS1 (e.g., having a better angle for reflected imaging light, being able to view the corner at surface point SP3, etc.) The vision probe 300 at the orientation of FIG. 7C may thus in certain implementations be able to provide a more accurate 3-dimensional surface profile of the workpiece surface WPS1, in addition to having the smaller scan range SR2 as compared to the scan range SR1 of FIG. 7B.

In various implementations, it may also be desirable to perform different scans (including acquiring different image stacks) with the vision probe 300 in different orientations. For example, the workpiece WP1 is noted to include the workpiece surfaces WPS1, WPS2 and WPS3. In one implementation, the vision probe 300 may be positioned as illustrated in FIG. 7B (e.g., with a 0 degree tilt relative to the vertical orientation) for acquiring an image stack for scanning the workpiece surface WPS2, and then oriented as illustrated in FIG. 7C (e.g., with a 45 degree tilt relative to vertical) for acquiring an image stack for scanning the workpiece surface WPS1, and then oriented (e.g., with a 90 degree tilt relative to vertical) to acquire an image stack for scanning the workpiece surface WPS3.

In some implementations, the scans/image stacks may be made to include all or parts of multiple workpiece surfaces. For example, the images (and the field of view) for the scan of the workpiece surface WPS2 at the 0 degree tilt could also include all or part of the workpiece surface WPS1 (and/or the workpiece surface WPS3). Such processes, wherein multiple image stacks may include at least some common surface points as scanned/imaged from different orientations, may help further verify the 3D positions of each of the surface points and/or enable accurate alignment/reassembly of the various 3D data corresponding to the different workpiece surfaces to form a total or partial 3D representation of the workpiece WP1. For example, in various implementations, the 3D profiles of the various surfaces may be "stitched together" or otherwise combined to form the total or partial 3D representation of the workpiece WP1. In addition, some workpiece features (e.g., WPF2/WPF3C) may have certain dimensions/aspects that may be included in scans of multiple surfaces (e.g., WPS2 and WPS3), and the scans of each surface may be utilized/combined for determining the overall characteristics/dimensions/3D profile of the workpiece features WPF2/WPF3C. Such possible operations and processes illustrate another advantage of the present disclosure, in that certain of the prior art systems typically only enabled the acquisition of image stacks from a single orientation (e.g., along the Z-axis of the MCS), whereas the present disclosure enables a CMM system to utilize a vision probe to acquire multiple image stacks from multiple orientations for analyzing/measuring/determining 3D profiles for multiple workpiece surfaces and/or features that may be at different orientations. Such 3D data for the various surfaces/features of a workpiece may then be combined or otherwise utilized to determine an overall 3D profile of all or part of the workpiece and/or certain workpiece features.

In the PFF type analysis as described above in reference to FIGS. 6A and 6B, each focus curve (as shown in FIG. 6A) corresponds to a single point on the workpiece surface. That is, the peak of each focus curve indicates the Zp position of the single point along the direction of the optical axis OA of the vision probe 300. In various implementations, the PFF type analysis repeats this process for multiple surface points (e.g., each with a corresponding region of interest) across the workpiece surface such that an overall profile of the workpiece surface can be determined. In general, the process may be performed for the multiple surface points that are within a field of view (i.e., as captured within the images of the image stack), where for each image of the image stack, a particular ROI(i) corresponds to a particular point on the workpiece surface (with the point preferably at the center of the ROI). Additionally referring to FIG. 7B, as one illustrative example if the ROI(1) corresponds to a surface point at the edge of the bottom of the cylindrical hole workpiece feature WPF1 (e.g., adjacent to surface point SP3), and if the ROI(2) corresponds to a surface point on the workpiece surface WPS1 (e.g., at surface point SP2) which is not in the cylindrical hole, the focus curves corresponding to the two illustrative surface points will be different and will have different focus peaks. For example, a focus curve such as that of FIG. 6A would be shifted for the surface point SP2, with the peak at a different location (e.g., indicating a focus position closer to the vision probe 300 and thus higher in the portion of the image stack illustrated in FIG. 6B, or even higher in a portion of the image stack not illustrated in FIG. 6B, such as in an implementation where the image stack has additional images beyond the 11 images that are illustrated.)

For the total available volume of movement for the CMM 100 with the X, Y and Z-axis slide mechanisms 225-227, if movement is only made along the Z-axis (i.e., using only the Z-axis slide mechanism 227) for adjusting the focus of the vision probe 300 (e.g., similar to techniques as were used in certain prior machine vision systems for acquiring image stacks), the total range of motion of the potential image stack acquisition process would be limited to the maximum range of motion of the Z-axis slide mechanism 227. In contrast, in accordance with the techniques of the present disclosure, the vision probe 300 may be moved across the diagonal of the overall available movement volume of the CMM 100 for acquiring an image stack, which may generally provide a longer potential scan range and greater flexibility for the acquisition of image stacks for scanning various workpiece surfaces from different angles.

As described earlier, in some implementations, in addition to utilizing the vision probe 300 to obtain an image stack for determining a 3-dimensional surface profile, it may also be useful in some instances to utilize the tactile measuring probe 390 (i.e., a probe with a probe tip that physically touches the workpiece for determining measurements, such as a touch probe, or a scanning probe for which the probe tip is positioned in contact and slid along so as to "scan" over the surface of the workpiece) in combination with the vision probe 300. For example, after the vision probe 300 is utilized, the vision probe 300 may be detached from the CMM 100, and the tactile measuring probe 390 may be attached to the CMM 100 and used for verifying the position of certain surface points, and/or measuring certain surface points, such as those which may not have been well imaged by the vision probe 300. For example, in the implementation of FIG. 7C, the exact location of the surface point SP3 may be difficult to determine from an image stack captured by the vision probe 300, given that in the illustrated orientation the surface point SP3 is directly beneath the surface point SP2 along the optical axis OA of the vision probe 300. In such an instance, the tactile measuring probe 390 may be utilized to verify the position of certain surface points (e.g., along the edges and/or at the bottom corners of the cylindrical-hole workpiece feature WPF1, such as surface points SP3 and SP4, etc.).

As noted previously, in some implementations it may be desirable to have the optical axis of the vision probe 300 be approximately perpendicular to a workpiece surface that is being scanned (i.e., for which an image stack is being captured). It should be noted that the optical axis of the vision probe 300 may be perpendicular to only a portion of the workpiece surface, or in some instances may not actually be perpendicular to any particular portion of the workpiece surface but instead perpendicular only to the general overall or average, etc. orientation of the workpiece surface. For example, if the workpiece surface is particularly uneven and/or includes numerous workpiece features forming a complicated or otherwise uneven 3-dimensional profile/surface topography, the optical axis/image stack acquisition axis (OA/ISAA) may not be precisely perpendicular to any particular portion of the workpiece surface, but may be approximately/nominally perpendicular to an overall, average and/or general, etc. orientation or principle angle of the workpiece surface.

Still referring to FIGS. 7A-7C, further implementation examples of the CMM 100 will be described for obtaining and using image stacks to determine a "depth map" and/or the "surface topography" of the workpiece surface. In some instances, it may be described that the overall workpiece surface may be at a "principal angle," which corresponds to the workpiece angle A-W described with respect to FIG. 3B, which is an angle formed between the workpiece surface and a horizontal plane on which the workpiece sits. As described previously, in some implementations it may be advantageous or otherwise desirable to have the image stack acquisition axis ISAA generally perpendicular to the workpiece surface at the principal angle (A-W). Even if the image stack acquisition axis ISAA is not perfectly perpendicular to the general orientation of the workpiece surface, such can be addressed in part by the processing of the image data depending on the particular application (e.g., including how the user wishes to have the image data presented, etc.) More specifically, as the image stack is utilized to determine the depth map and/or the surface topography of the workpiece surface, if it is determined that a normal to the workpiece surface at the principal angle (A-W) is not perfectly aligned with the ISA axis and instead forms an angle with the ISA axis (i.e., the workpiece surface is not perfectly perpendicular to the ISA axis), such angle offset may be subtracted out or otherwise compensated as part of the processing of the image data, so that the depth map or the surface topography of the workpiece surface may generally be determined/presented across a level plane of the workpiece surface (e.g., as may be desirable for certain presentations and/or analysis, etc.) In some implementations, if a user or system is visually or otherwise evaluating a workpiece surface for defects, it may be preferred to have a general level presentation of the workpiece surface, for which the defects may be more easily discernible/determined as height deviations from the otherwise level workpiece surface (e.g., in accordance with the defects and/or other deviations having coordinates above or below those of the general level surface).

In various exemplary implementations of the CMM 100, a principal angle (A-W) of the workpiece surface to be measured may initially be determined so as to know at what angle to orient the vision probe 300 for imaging the workpiece surface. In various exemplary implementations, the dimensions and characteristics of the workpieces to be measured, including their principal angles, may be known, for which the CMM 100 may be utilized to carry out the precision measurement and/or inspection. Once the principal angle is known or determined, a desired angular orientation of the vision probe 300 can be determined (e.g., so as to be generally perpendicular to at least a portion of the workpiece surface). As described above, by orienting the vision probe 300 relative to the workpiece surface in such a manner, the required range for an image stack can be made relatively smaller/shorter, thus allowing the image stack to be acquired more quickly and/or allowing a same number of images to be acquired in a denser image stack (i.e., with smaller corresponding focus position spacings between the images), as compared to an image stack with an identical number of images that is more spaced out (i.e., with larger corresponding focus position spacings between the images) as required to cover a larger scan range.

In reference to FIGS. 7B and 7C, program instructions when executed by the one or more processors of the CMM 100 may cause the one or more processors to acquire a first image stack as in FIG. 7C, and to acquire a second image stack as in FIG. 7B. In FIG. 7C, the workpiece surface WPS1 may be designated as a first workpiece surface, and the orientation of the vision probe 300, which is a first orientation, may be used to acquire the first image stack of the first workpiece surface of the workpiece WP1. In FIG. 7B, the workpiece surface WPS2 may be designated as a second workpiece surface that is oriented at a different angle than the first workpiece surface WPS1, and the orientation of the vision probe 300, which is a second orientation that is different than the first orientation, may be used to acquire the second image stack of the second workpiece surface of the workpiece WP1. In the orientation illustrated in FIG. 7B, the second image stack may have a field of view that primarily includes the workpiece surface WPS2 (the second workpiece surface), but may also include all or part of the workpiece surface WPS1 (the first workpiece surface). Similarly, in the orientation illustrated in FIG. 7C, the first image stack may have a field of view that primarily includes the workpiece surface WPS1 (the first workpiece surface), but may also include all or part of the workpiece surface WPS2 (the second workpiece surface).

In various implementations, in addition to focus curve data that may be determined based at least in part on an analysis of the first image stack (e.g., in relation to FIG. 7C), additional focus curve data may be determined based at least in part on an analysis of the second image stack (e.g., in relation to FIG. 7B), wherein the additional focus curve data indicates 3-dimensional positions of a plurality of surface points on the second workpiece surface (e.g., workpiece surface WPS2) of the workpiece. In various implementations, the system may determine and/or display a 3-dimensional representation of at least a portion of the first workpiece surface WPS1 based at least on the focus curve data that is determined based on analysis of the first image stack but not on analysis of the second image stack. Similarly, the system may determine and/or display a 3-dimensional representation of at least a portion of the second workpiece surface WPS2 based at least on the focus curve data that is determined based on analysis of the second image stack but not on analysis of the first image stack.

For example, in some implementations where the first and second image stacks may each include portions or all of both of the workpiece surfaces WPS1 and WPS2, focus curve data that is determined for the first workpiece surface WPS1 based on analysis of the first image stack (for which the first image stack acquisition axis ISAA1 may be approximately perpendicular to at least a portion of the first workpiece surface WPS1) may be considered and/or determined to be more accurate and/or with higher quality/certainty than focus curve data that is determined for the first workpiece surface WPS1 based on analysis of the second image stack (for which the second image stack acquisition axis ISAA2 is not approximately perpendicular to the at least a portion of the first workpiece surface WPS1, and in particular is further from perpendicular than the first image stack acquisition axis ISAA1).

As described in more detail in U.S. Pat. No. 8,581,162, which is hereby incorporated herein by reference in its entirety, certain focus peak certainty and/or Z-height quality meta-data analysis may indicate the reliability and/or quality of certain 3-dimensional data that is determined (e.g., as related to a region of interest in an image stack). While the '162 patent performs such analysis in relation to the quality/reliability of the determination of coordinates for neighboring workpiece surface points in a single image stack (i.e., as acquired only along a Z-axis direction of a machine coordinate system), in accordance with the present disclosure certain similar principles may be applied to considerations of the quality/reliability of the determination of coordinates of workpiece surface points in one image stack versus another image stack (e.g., as acquired at different angles). For example, in some implementations focus curve data that is determined for an image stack acquired with an image stack acquisition axis ISAA that is approximately perpendicular to a portion of a workpiece surface may be relatively more accurate for determining coordinates of workpiece surface points on that portion of the workpiece surface than an image stack with an image stack acquisition axis that is less perpendicular. In certain implementations, as described above, the greater accuracy may result at least in part from the more perpendicular orientation of the vision probe/optical axis relative to the workpiece surface causing more of the imaging light to be reflected back to the vision probe 300 (e.g., which may result in higher focus peaks and higher corresponding reliability and/or quality of the 3-dimensional data). In certain implementations, the relative accuracy may also be due in part to more of the neighboring workpiece surface points/pixels being in focus at a same time in a given image of the image stack in the more perpendicular orientation, thus allowing higher focus metric values to be determined (e.g., based on contrast or other focus metrics). In comparison, focus curve data that is determined for an image stack acquired with an image stack acquisition axis ISAA that is relatively far from being perpendicular to a portion of a workpiece surface may be relatively less accurate for determining coordinates of workpiece surface points on that portion of the workpiece surface. In certain implementations, as described above, the lower accuracy may result at least in part from the less perpendicular orientation of the vision probe/optical axis relative to the workpiece surface causing less of the imaging light to be reflected back to the vision probe 300 (e.g., which may result in lower focus peaks and lower corresponding reliability and/or quality of the 3-dimensional data). In various implementations, the relative inaccuracy may also be due in part to fewer of the neighboring workpiece surface points/pixels being in focus at the same time (i.e., due to the slope of the portion of the workpiece surface relative to the image stack acquisition axis, for which in some instances only a "stripe" of the relatively sloped workpiece surface that is at a same Z-distance in the probe coordinate system may be precisely in focus at the same time, thus resulting in fewer "in focus" pixels/surface points in the region of interest in a given image of the image stack that contribute higher amounts to the overall focus metric for the region of interest with the corresponding central surface point/pixel). More specifically, in some instances more in focus pixels in a region of interest at a same time in a given image may result in a higher focus peak, for which the determination of the focus peak position may be more accurate (e.g., less susceptible to noise or other factors), thus resulting in better focus peak certainty.

As another example, in various implementations the CMM 100 may acquire a commonly imaged surface point, such as the surface point SP2 on a first portion of the first workpiece surface WPS1, which is imaged in both the first image stack and the second image stack, wherein the first image stack acquisition axis ISAA1 (of FIG. 7C) is closer to perpendicular to the first portion of the first workpiece surface WPS1 than is the second image stack acquisition axis ISAA2 (of FIG. 7B). The focus curve data that is determined based at least in part on the analysis of the first image stack may indicate a first 3-dimensional position of the commonly imaged surface point SP2 (e.g., which in one example may correspond to a first set of determined coordinates, such as (XP2C, YP2C, ZP2C)). On the other hand, the focus curve data that is determined based at least in part on the analysis of the second image stack may indicate a second 3-dimensional position of the commonly imaged surface point SP2 (e.g., which in one example may correspond to a second set of determined coordinates, such as (XP2B, YP2B, ZP2B)). It is noted that in various implementations the second determined 3-dimensional position (e.g., at the determined coordinates XP2B, YP2B, ZP2B) may different than the first determined 3-dimensional position (e.g., at the determined coordinates XP2C, YP2C, ZP2C), and the first 3-dimensional position may be at least one of indicated or determined to be more reliable/accurate than the second 3-dimensional position and may be utilized instead of the second 3-dimensional position as part of a set of 3-dimensional data for the workpiece. As described above, such techniques may be advantageous in that focus curve data that is determined for an image stack acquired with an image stack acquisition axis ISAA that is approximately perpendicular to a portion of a workpiece surface and/or workpiece feature may be relatively more accurate than focus curve data that is determined for an image stack acquired with an image stack acquisition axis ISAA that is less perpendicular to the portion of a workpiece surface and/or workpiece feature. Thus, for the surface point SP2, the determined first 3-dimensional position (e.g., having determined coordinates XP2C, YP2C, ZP2C) may be more accurate than the determined second 3-dimensional position (e.g., having determined coordinates XP2B, YP2B, ZP2B), and accordingly it may be advantageous to utilize the determined first 3-dimensional position as part of the 3-dimensional data set for representing the surface point SP2 of the workpiece WP1.

Figure 8:
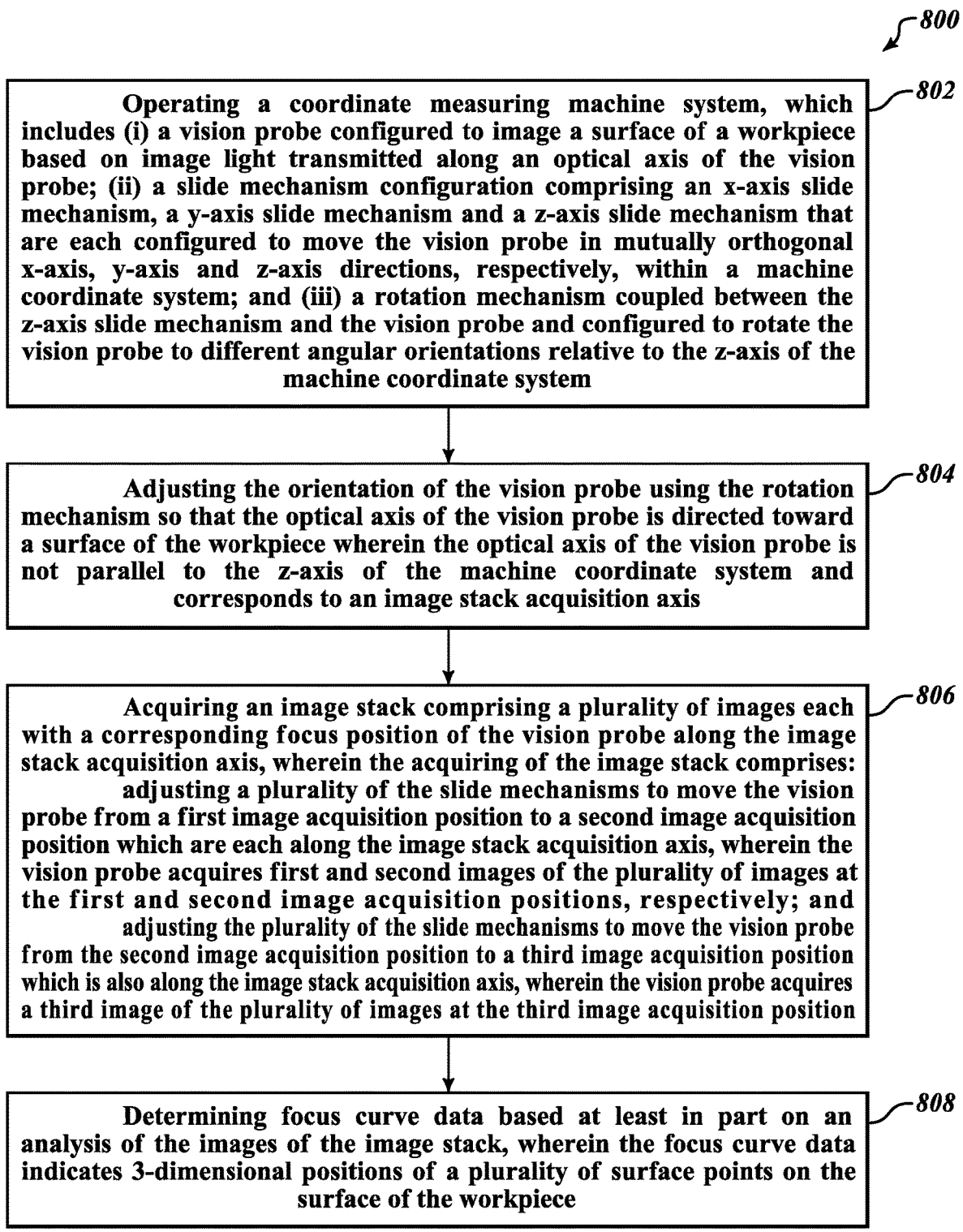
FIG. 8 is a flowchart of a method of measuring a workpiece surface by using the CMM system including the movement mechanism configuration, such as that described in FIGS. 1-7C, to acquire an image stack by moving the vision probe at a desired angle/orientation relative to the workpiece surface.

FIG. 8 is a flowchart of a method of measuring a workpiece surface by using the CMM system including the movement mechanism configuration as described in FIGS. 1-7C, to move the vision probe along multiple axes and at a desired angle/orientation relative to the workpiece surface. The method includes generally four steps.

Block 802 includes a step of operating a coordinate measuring machine (CMM) system, which includes (i) a vision probe 300 configured to image a surface of a workpiece WP based on image light transmitted along an optical axis OA of the vision probe 300; (ii) a slide mechanism configuration comprising an x-axis slide mechanism, a y-axis slide mechanism and a z-axis slide mechanism 225-227 that are each configured to move the vision probe 300 in mutually orthogonal x-axis, y-axis and z-axis directions, respectively, within a machine coordinate system MCS; and (iii) a rotation mechanism 214 coupled between the z-axis slide mechanism and the vision probe 300 and configured to rotate the vision probe 300 to different angular orientations relative to the z-axis of the machine coordinate system.

Block 804 includes a step of adjusting the orientation of the vision probe 300 using the rotation mechanism so that the optical axis OA of the vision probe 300 is directed toward a surface of the workpiece WP wherein the optical axis OA of the vision probe 300 is not parallel to the z-axis of the machine coordinate system and corresponds to an image stack acquisition axis ISAA. As noted above, in various implementations the optical axis OA may be approximately/nominally perpendicular to at least a portion of the workpiece surface, for which the workpiece surface may be angled (e.g., may not be horizontal within the machine coordinate system).

Box 806 includes a step of acquiring an image stack comprising a plurality of images each with a corresponding focus position of the vision probe 300 along the image stack acquisition axis. The acquiring of the image stack includes: (i) adjusting a plurality of the slide mechanisms 225-227 to move the vision probe 300 from a first image acquisition position to a second image acquisition position which are each along the image stack acquisition axis, wherein the vision probe 300 acquires first and second images of the plurality of images at the first and second image acquisition positions, respectively; and (ii) adjusting the plurality of the slide mechanisms 225-227 to move the vision probe 300 from the second image acquisition position to a third image acquisition position which is also along the image stack acquisition axis, wherein the vision probe 300 acquires a third image of the plurality of images at the third image acquisition position.

Box 808 includes a step of determining focus curve data based at least in part on an analysis of the images of the image stack, wherein the focus curve data indicates 3-dimensional positions of a plurality of surface points on the surface of the workpiece.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations.

What is claimed is:

1. A coordinate measuring machine system, comprising:
    a vision probe comprising:
        a light source;
        an objective lens that inputs image light arising from a surface of a workpiece which is illuminated by the light source, and transmits the image light along an imaging optical path, wherein the objective lens defines an optical axis of the vision probe which extends at least between the objective lens and the workpiece surface;
        a camera that receives imaging light transmitted along the imaging optical path and provides images of the workpiece surface;
    a slide mechanism configuration comprising an x-axis slide mechanism, a y-axis slide mechanism and a z-axis slide mechanism that are each configured to move the vision probe in mutually orthogonal x-axis, y-axis and z-axis directions, respectively, within a machine coordinate system;
    a rotation mechanism coupled between the z-axis slide mechanism and the vision probe and configured to rotate the vision probe to different angular orientations relative to the z-axis of the machine coordinate system;
    one or more processors; and
    a memory coupled to the one or more processors and storing program instructions that when executed by the one or more processors cause the one or more processors to at least:
        adjust the orientation of the vision probe using the rotation mechanism so that the optical axis of the vision probe is directed toward a surface of the workpiece wherein the optical axis of the vision probe is not parallel to the z-axis of the machine coordinate system and corresponds to an image stack acquisition axis;
        acquire an image stack comprising a plurality of images each corresponding to a focus position of the vision probe along the image stack acquisition axis, wherein the acquiring of the image stack comprises:
            adjusting a plurality of the slide mechanisms to move the vision probe from a first image acquisition position to a second image acquisition position which are each along the image stack acquisition axis, wherein the vision probe acquires first and second images of the plurality of images at the first and second image acquisition positions, respectively; and
            adjusting the plurality of the slide mechanisms to move the vision probe from the second image acquisition position to a third image acquisition position which is also along the image stack acquisition axis, wherein the vision probe acquires a third image of the plurality of images at the third image acquisition position; and
        determine focus curve data based at least in part on an analysis of the images of the image stack, wherein the focus curve data indicates 3-dimensional positions of a plurality of surface points on the surface of the workpiece.

2. The system of claim 1, wherein as part of the analysis of the image stack each surface point of the plurality of surface points corresponds to a center of a region of interest in the image stack and the analysis includes determining a focus curve for each region of interest in the image stack as part of the focus curve data and for which a peak of each focus curve indicates the 3-dimensional position of the corresponding surface point.

3. The system of claim 1, wherein the program instructions when executed by the one or more processors further cause the one or more processors to display a 3-dimensional representation of the workpiece surface based at least in part on the focus curve data.

4. The system of claim 1, wherein the adjusting of the plurality of the slide mechanisms to move the vision probe from the first image acquisition position to the second image acquisition position comprises adjusting the x-axis slide mechanism by an x-axis image spacing, adjusting the y-axis slide mechanism by a y-axis image spacing and adjusting the z-axis slide mechanism by a z-axis image spacing.

5. The system of claim 4, wherein the spacings between each of the plurality of images in the image stack corresponds to the x-axis spacing, the y-axis spacing and the z-axis spacing.

6. The system of claim 1, wherein the distance along the image stack acquisition axis between the first and second image acquisition positions is the same as the distance along the image stack acquisition axis between the second and third image acquisition positions.

7. The system of claim 1, wherein the rotation mechanism is configured to orient the vision probe in a plurality of orientations, including at least:
   an orientation with the optical axis of the vision probe at a 0 degree angle relative to the z-axis of the machine coordinate system; and
   an orientation with the optical axis of the vision probe at a 45 degree angle relative to the z-axis of the machine coordinate system.

8. The system of claim 7, wherein the system is configured to acquire the image stack with the vision probe in the orientation with the optical axis of the vision probe at the 45 degree angle relative to the z-axis of the machine coordinate system.

9. The system of claim 1, wherein during the adjustments of the plurality of the slide mechanisms to move the vision probe between the image acquisition positions, the rotation mechanism is not adjusted such that the orientation of the vision probe is not adjusted and remains constant.

10. The system of claim 1, wherein during the acquisition of the image stack the optical axis of the vision probe which is not parallel to the z-axis of the machine coordinate system and the image stack acquisition axis are approximately perpendicular to at least a portion of the workpiece surface.

11. The system of claim 1, wherein the workpiece surface is a first workpiece surface and the orientation of the vision probe is a first orientation and the image stack is a first image stack that is acquired with the vision probe in the first orientation, and the program instructions when executed by the one or more processors further cause the one or more processors to acquire a second image stack with the vision probe in a second orientation that is different than the first orientation and with the optical axis of the vision probe directed to a second workpiece surface of the workpiece that is oriented at a different angle in the machine coordinate system than the first workpiece surface.

12. The system of claim 11, wherein the program instructions when executed by the one or more processors further cause the one or more processors to determine focus curve data based at least in part on an analysis of the second image stack, wherein the focus curve data indicates 3-dimensional positions of a plurality of surface points on the second workpiece surface of the workpiece.

13. The system of claim 12, wherein the program instructions when executed by the one or more processors further cause the one or more processors to:
   display a 3-dimensional representation of at least a portion of the first workpiece surface based at least on the focus curve data that is determined based on analysis of the first image stack but not on analysis of the second image stack; and
   display a 3-dimensional representation of at least a portion of the second workpiece surface based at least on the focus curve data that is determined based on analysis of the second image stack but not on analysis of the first image stack.

14. The system of claim 12, wherein a commonly imaged surface point on a first portion of the first workpiece surface is imaged in both the first and second image stacks, for which the first image stack acquisition axis is closer to perpendicular to the first portion of the first workpiece surface than is the second image stack acquisition axis, and for which the focus curve data that is determined based at least in part on the analysis of the first image stack indicates a first 3-dimensional position of the commonly imaged surface point and the focus curve data that is determined based at least in part on the analysis of the second image stack indicates a second 3-dimensional position of the commonly imaged surface point that is different than the first 3-dimensional position, and for which the first 3-dimensional position is at least one of indicated or determined to be more reliable than the second 3-dimensional position and is utilized instead of the second 3-dimensional position as part of a set of 3-dimensional data for the workpiece.

15. The system of claim 1, wherein the objective lens has a specified magnification and is selected for utilization in the vision probe from a range of objective lenses with different magnifications.

16. A method of measuring a workpiece surface, comprising:
   operating a coordinate measuring machine system, including (i) a vision probe configured to image a surface of a workpiece based on image light transmitted along an optical axis of the vision probe; (ii) a slide mechanism configuration comprising an x-axis slide mechanism, a y-axis slide mechanism and a z-axis slide mechanism that are each configured to move the vision probe in mutually orthogonal x-axis, y-axis and z-axis directions, respectively, within a machine coordinate system; and (iii) a rotation mechanism coupled between the z-axis slide mechanism and the vision probe and configured to rotate the vision probe to different angular orientations relative to the z-axis of the machine coordinate system;
   adjusting the orientation of the vision probe using the rotation mechanism so that the optical axis of the vision probe is directed toward a surface of the workpiece wherein the optical axis of the vision probe is not parallel to the z-axis of the machine coordinate system and corresponds to an image stack acquisition axis;
   acquiring an image stack comprising a plurality of images each corresponding to a focus position of the vision probe along the image stack acquisition axis, wherein the acquiring of the image stack comprises:
      adjusting a plurality of the slide mechanisms to move the vision probe from a first image acquisition position to a second image acquisition position which are each along the image stack acquisition axis, wherein the vision probe acquires first and second images of the plurality of images at the first and second image acquisition positions, respectively; and adjusting the plurality of the slide mechanisms to move the vision probe from the second image acquisition position to a third image acquisition position which is also along the image stack acquisition axis, wherein the vision probe acquires a third image of the plurality of images at the third image acquisition position; and determining focus curve data based at least in part on an analysis of the images of the image stack, wherein the focus curve data indicates 3-dimensional positions of a plurality of surface points on the surface of the workpiece.

17. The method of claim 16, further comprising:
displaying a 3-dimensional representation of the workpiece surface on a screen.

18. The method of claim 16, wherein the adjusting of the orientation of the vision probe using the rotation mechanism includes setting the optical axis of the vision probe approximately perpendicular to at least a portion of the workpiece surface, and for which during the acquisition of the image stack the orientation of the vision probe is not further adjusted and remains approximately constant.

19. The method of claim 16, wherein the workpiece surface is a first workpiece surface and the orientation of the vision probe is a first orientation and the image stack is a first image stack that is acquired with the vision probe in the first orientation, and the method further comprises:

acquiring a second image stack with the vision probe in a second orientation that is different than the first orientation and with the optical axis of the vision probe directed to a second workpiece surface of the workpiece that is oriented at a different angle than the first workpiece surface.

20. The method of claim 19, further comprising:
determining second focus curve data based at least in part on an analysis of the second image stack, wherein the second focus curve data indicates 3-dimensional positions of a plurality of surface points on the second workpiece surface of the workpiece.

21. The method of claim 20, further comprising:
displaying a 3-dimensional representation of at least a portion of the first workpiece surface based at least on the focus curve data that is determined based on analysis of the first image stack but not on analysis of the second image stack; and displaying a 3-dimensional representation of at least a portion of the second workpiece surface based at least on the second focus curve data that is determined based on analysis of the second image stack but not on analysis of the first image stack.

* * * * *